(12) United States Patent
Tomlinson

(10) Patent No.: US 9,899,955 B2
(45) Date of Patent: Feb. 20, 2018

(54) INTEGRATED ELECTRICAL AND MECHANICAL PHOTOVOLTAIC ARRAY INTERCONNECTION SYSTEM

(71) Applicant: PV Solutions, LLC, Portsmouth, RI (US)

(72) Inventor: Joseph Tomlinson, Portsmouth, RI (US)

(73) Assignee: PV Solutions, LLC, Portsmouth, RI (US)

( * ) Notice: Subject to any disclaimer, the term of this patent is extended or adjusted under 35 U.S.C. 154(b) by 0 days.

(21) Appl. No.: 15/009,265

(22) Filed: Jan. 28, 2016

(65) Prior Publication Data

US 2016/0226434 A1    Aug. 4, 2016

Related U.S. Application Data

(60) Provisional application No. 62/248,722, filed on Oct. 30, 2015, provisional application No. 62/159,070, filed on May 8, 2015, provisional application No. 62/132,426, filed on Mar. 12, 2015, provisional application No. 62/108,997, filed on Jan. 28, 2015.

(51) Int. Cl.
*H01L 31/042* (2014.01)
*H02S 20/23* (2014.01)
*F24J 2/52* (2006.01)
*H02S 40/36* (2014.01)

(52) U.S. Cl.
CPC ............... *H02S 20/23* (2014.12); *F24J 2/52* (2013.01); *H02S 40/36* (2014.12); *Y02B 10/12* (2013.01)

(58) Field of Classification Search
CPC .......... H02S 20/23–20/25; H02S 40/34; H02S 40/36
USPC ................................................. 136/243–265
See application file for complete search history.

(56) References Cited

U.S. PATENT DOCUMENTS

| | | | |
|---|---|---|---|
| 7,406,800 B2 * | 8/2008 | Cinnamon | F24J 2/5211 136/244 |
| 2012/0085394 A1 * | 4/2012 | McPheeters | H02S 20/20 136/251 |

* cited by examiner

*Primary Examiner* — Niki Bakhtiari
(74) *Attorney, Agent, or Firm* — Sheridan Ross P.C.

(57) ABSTRACT

A mount system for a photovoltaic (PV) panel array allows for ease of installation, flexibility of movement, and the ability to remove and redeploy the system as needed. The system includes a plurality of modules which support a PV panel and a plurality of purlin connectors which interconnect with the modules. The system further includes a plurality of electrical connections which allow each of the modules to be in electrical communication with one another and may further a junction box, also in electrical communication with the modules.

10 Claims, 52 Drawing Sheets

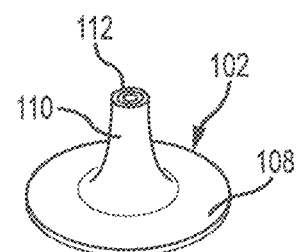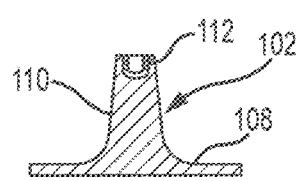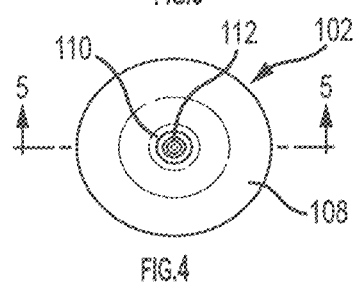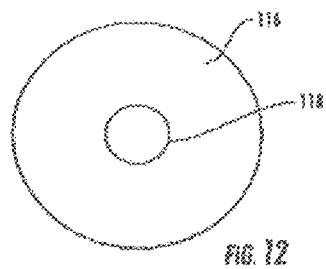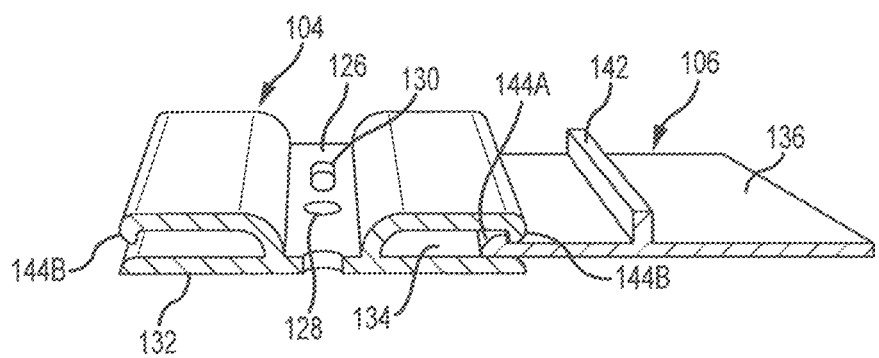

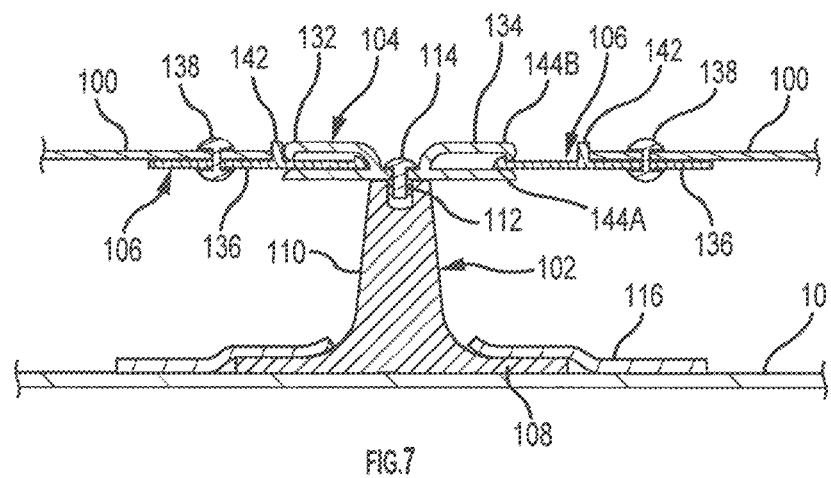
FIG. 7
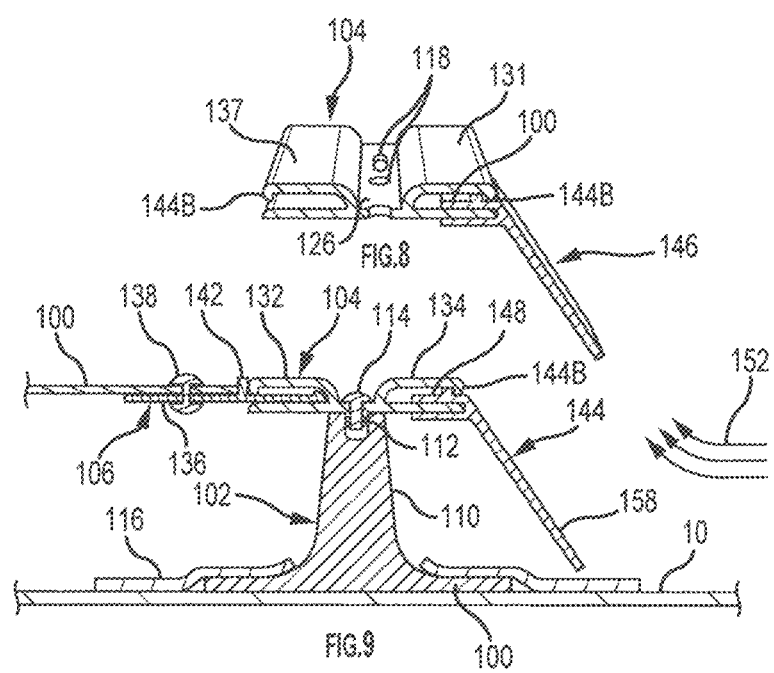
FIG. 8
FIG. 9

An Embodiment of the Mount System

ANOTHER EMBODIMENT

Proposed Concept

*Features:*
- *Same Rail and Module Bracket Extrusion for North and South sides of module.*
- *Angle changes handled with alternate Standoff Brackets.*
- *Compliance for tolerances and expansion is accounted for by a slotted connection between the Standoff Bracket and Standoff.*

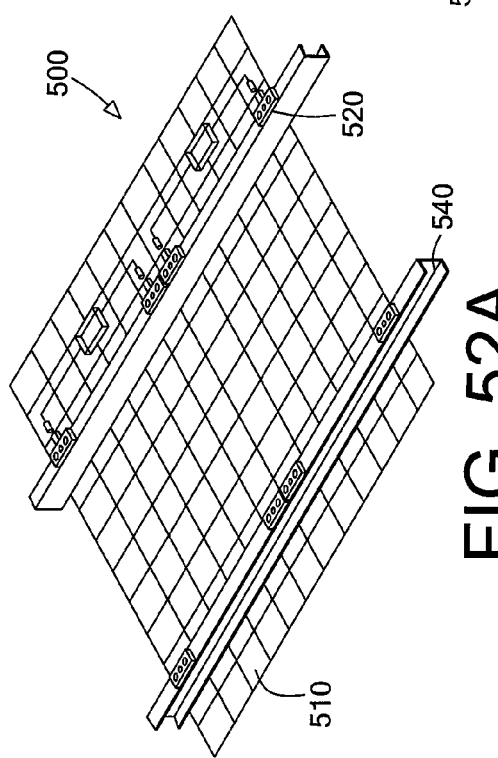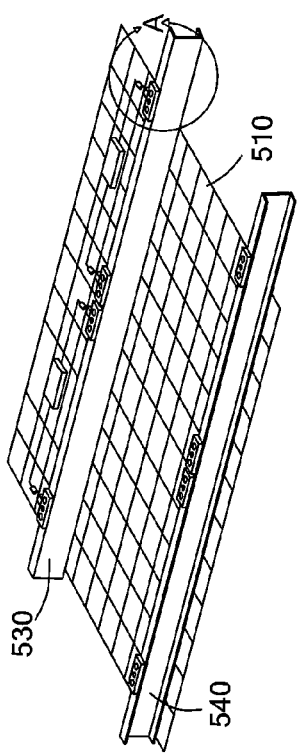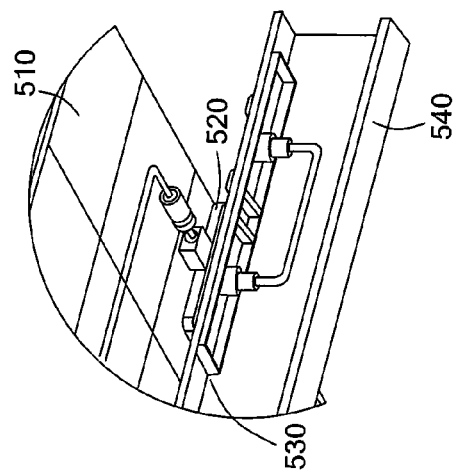
FIG. 52A
FIG. 52B
FIG. 52C

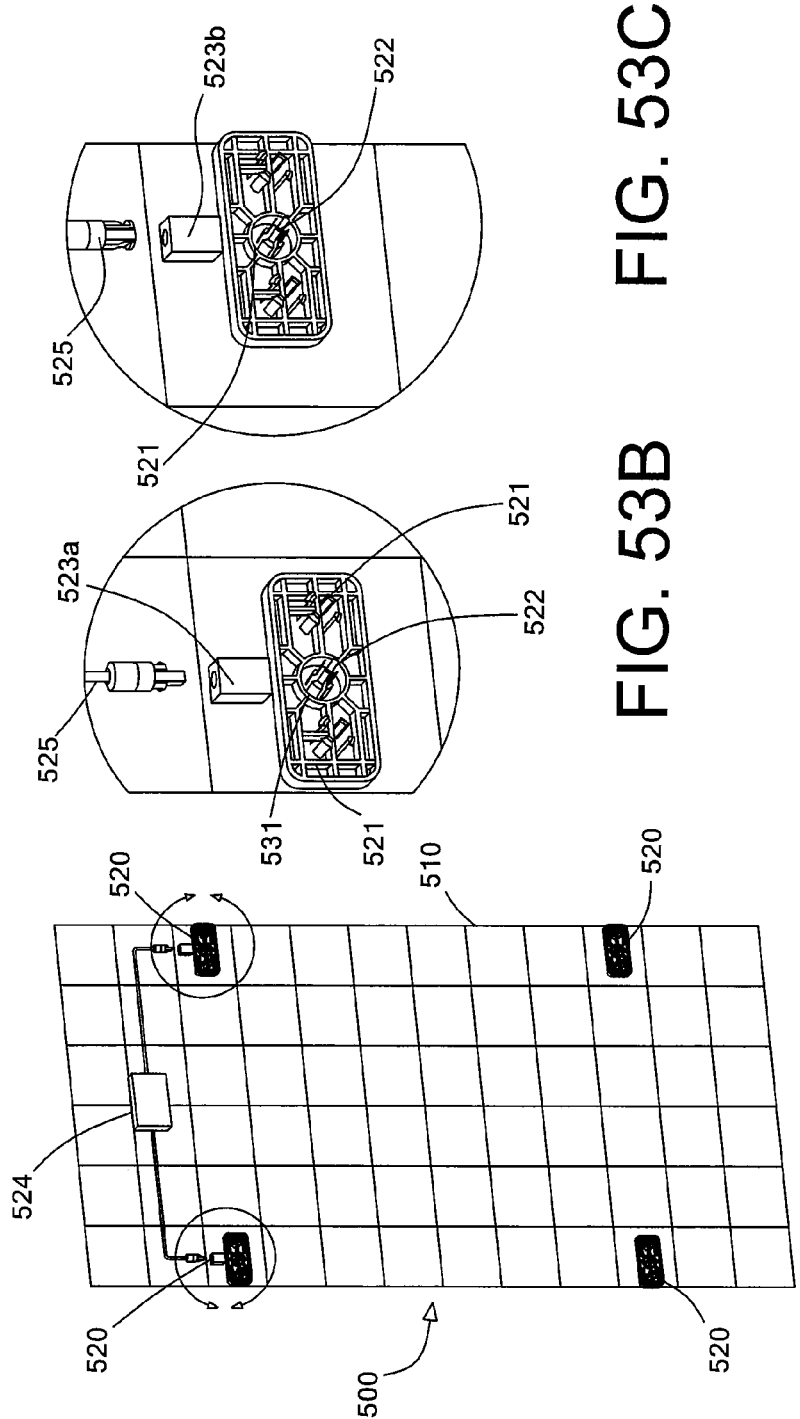

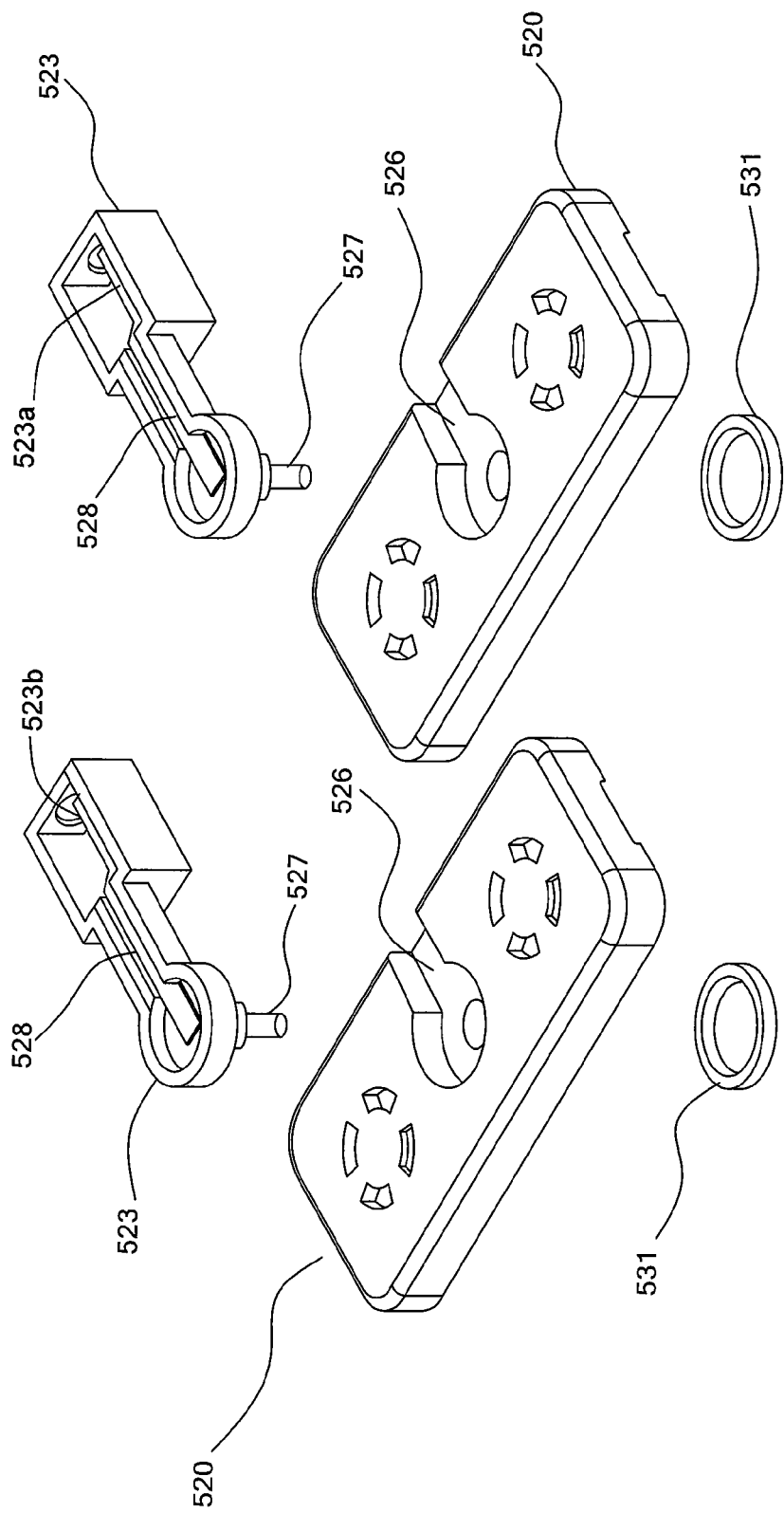

INTEGRATED ELECTRICAL AND MECHANICAL PHOTOVOLTAIC ARRAY INTERCONNECTION SYSTEM

CROSS REFERENCE TO RELATED APPLICATIONS

This application claims priority under 35 U.S.C. § 119(e) to U.S. Provisional Patent Application Ser. No. 62/248,722 filed Oct. 30, 2015, U.S. Provisional Patent Application Ser. No. 62/159,070 filed on May 8, 2015, U.S. Provisional Patent Application Ser. No. 62/132,426 filed on Mar. 12, 2015, and U.S. Provisional Patent Application Ser. No. 62/108,997 filed on Jan. 28, 2015, all of which are hereby incorporated by reference in their entirety.

This application is also related to U.S. patent application Ser. No. 13/602,161 filed on Sep. 2, 2012, U.S. patent application Ser. No. 13/602,392 filed on Sep. 4, 2012, U.S. patent application Ser. No. 14/853,642 filed on Sep. 14, 2015, and U.S. patent application Ser. No. 14/855,683 filed on Sep. 16, 2015, all of which are hereby incorporated by reference in their entirety.

FIELD

This invention is in the field of mount systems for a photovoltaic (PV) panel array that allows for ease of installation, flexibility of movement, and the ability to remove and redeploy the system as needed. The invention also relates to integrated electrical and mechanical photovoltaic array interconnection systems.

BACKGROUND OF THE INVENTION

The present invention relates to photovoltaic (PV) arrays, and more particularly to a mounting system for deploying commercial-scale solar panel arrays on geomembrane applications including roofing, reservoir covers, and exposed geomembrane covers on landfills and brownfields.

The improving economics of deploying solar arrays is making it attractive for facility owners and/or operators of assets such as rooftops, reservoirs, landfills and brownfields to deploy commercial-scale photovoltaic (PV) solar panel systems on these assets. In landfill and brownfield applications, deploying solar arrays directly to exposed geomembrane caps (EGC's) provides additional savings due to the elimination of costs associated with installation and maintenance of a two (2) foot vegetative layer required on traditional landfills. Referring to FIG. 1, a conventional grass-topped landfill cover system is shown on the right. The geomembrane cap is indicated at 10. Beneath the geomembrane 10 is waste, an intermediate cover layer and a final grading layer. Grass-topped cover systems require additional layers of drainage media, support soil, top soil, and grass on top of the geomembrane 10. Maintenance of the grass on top is a continuing expense.

On the left of FIG. 1, is an EGC system including a flexible solar panel 12 adhered directly to the surface of the geomembrane 10. The deployment of solar covers such as these require geomembrane materials that can remain exposed to the elements for years and serve as a substrate for adhering flexible photovoltaic panels. In these cover systems, the exposed geomembrane is anchored directly into the landfill and the solar panels are adhered directly to the surface of the membrane. It can be appreciated from the side-by-side figures that the elimination of the grass, top soil and vegetative soil layers will significantly increase the amount of waste that can be accumulated for closing the landfill. Conventional solar arrays using rigid glass-encapsulated panels on metal frames with concrete bases, are less desirable because of the weight of these systems on the landfills. The weight and requisite rigidity of conventional array systems combined with the differential settlement of the underlying waste, causes movement of the arrays which can cause breakage of panels. Over the course of a 20 year deployment, the waste material beneath the cover will settle significantly and cause movement of both the membrane and the photovoltaic panels.

Accordingly, the prior art methods of deploying solar panels on exposed membranes have focused on using flexible panels (See FIGS. 1 and 2) and directly adhering the flexible panels 12 to the surface of the geomembrane 10 using adhesive backing. The flexible geomembrane 10 and flexible panels 12 were thought to be better suited to provide for settling of the waste material over time. Flexibility and movement of the panels is critical to long-term deployment.

Initial attempts at adhering the panels directly to the membrane have had some success. There are several deployed systems that are currently in operation across the country. However, there are also obvious drawbacks to adhering the panels directly to the membrane. A major drawback that has been encountered is maintenance of the panels and geomembranes, and repair or replacement of panels should they be defective or become damaged. While the panels are engineered to withstand the elements, there is still significant risk that the panels will become damaged over a lengthy period of time and will need to be replaced. Even though the panels are flexible, settlement of the waste material results in movement of the membrane and places tremendous stress on the adhered panels causing failures of the adhesive and requiring re-adhering of the panels or panel replacement. In addition, there are known issues with the adhered panels tearing the membranes due to thermal expansion where the adhesive constrains movement of the geomembrane. The coefficient of thermal expansion of the panels is different than that of the membrane. At both high and low temperatures, expansion or contraction of the panels relative to the membrane causes shearing stress on the adhesive layer and can result in failure of the panel, geomembrane and/or adhesive layer.

Another drawback is the inability to redeploy the solar array in the event the facility should require its removal for any reason. This is not possible when the panels are adhered directly to the membrane. For example, certain landfill operators plan and develop their facilities in stages that require shorter term deployment than the economics of a permanent adhesive attachment system can provide. A solar array that can be easily removed and redeployed would allow operators to attach to an EGC on a short term basis, and then remove and redeploy the array at a different location. This is not feasible when the panels are adhered directly to the membrane.

Further, as the cost of photovoltaic arrays continues to drop, the popularity of commercial and residential photovoltaic arrays continues to increase. With respect to rooftop installation, the photovoltaic array modules are currently attached to purlins with nuts and bolts, along with wires or zipties. Furthermore, clips are often utilized to hold the modules to the purlins. These methods are inefficient and ineffective, as it further requires rubber inserts to protect the module and separate the module from the metal of the purlin.

By way of providing additional background, context, and to further satisfy the written description requirement of 35

U.S.C. § 112, the following documents are hereby incorporated by reference in their entirety: U.S. patent application Ser. No. 13/494,298 to Kenny entitled "SOLAR MODULE MOUNTING APPARATUS"; U.S. patent application Ser. No. 13/730,601 to Kang entitled "PHOTOVOLTAIC MODULE FRAME WITH IMPROVED BODABILITY"; U.S. patent application Ser. No. 13/253,960 to Rizzo entitled "MOUNT FOR PITCHED ROOF AND METHOD OF USE"; U.S. patent application Ser. No. 13/759,846 to Zhao entitled "MOUNTING CLAMP AND MOUNTING CLAMP CONFIGURATION FOR PHOTOVOLTAIC MODULE INSTALLATION"; and U.S. patent application Ser. No. 14/211,984 to Duckworth entitled "SYSTEM AND METHOD FOR MOUNTING PHOTOVOLTAIC MODULES."

SUMMARY OF THE INVENTION

Accordingly, there is believed to be a need in the industry for a mounting system that will allow movement of the panels relative to the membrane if needed, to reduce failures and to facilitate replacement.

In one embodiment, the present invention provides a unique and novel, low-cost mounting system which will allow for ease of installation, flexibility of movement, and the ability to remove and redeploy the system as needed. The mount system in accordance with the teachings of the present invention generally comprises a plurality of standoff mounts which are secured to a substrate (geomembrane) in a parallel grid system, elongated mounting rails (female tracks) which are secured onto the standoff mounts in parallel, and attachment rails (male track inserts) which are either secured to opposing side edges of the PV panel, incorporated into the PV panels or incorporated into a supporting carrier for the PV panel. The male track inserts are slidably received into mounting channels on opposing side edges of the female tracks to suspend the solar panels between the tracks and above the substrate (geomembrane). The shapes of the mounting rails and attachment rails can vary extensively and are determined by the requirements of the specific array.

The standoff mounts include a base portion, and a neck portion extending upwardly from the base portion and a fastener received in the neck portion.

The standoff mounts can be secured to the membrane using a plurality of different attachment methods including, but not limited to adhesive bonding, ultrasonic welding, or annular bonding rings.

The base portions of the standoff mounts can also be bonded to a tape carrier with a predetermined spacing so that the standoff mounts can be quickly and easily installed in parallel strips onto the membrane. The tape carrier material is preferably the same as or similar to the membrane so that the tape carrier can be easily bonded to the membrane. Alternatively, a bonding tape can be provided with a plurality of holes formed at predetermined spacing.

The standoff mounts can also be bonded to a more rigid carrier strapping which can be used in other mounting configurations where the strapping can be secured to an underlying surface, such as a building roof or a vehicle roof with fasteners.

The mounting rail (female track) includes an elongated spine having a plurality of holes and/or elongated slots spaced longitudinally along the centerline. In use, the standoff mounts are spaced to match the spacing of the holes/slots in the track. When installed, the holes/slots align with the standoff mounts and fasteners are inserted through the holes/slots into the top of the neck portion. The elongated slots provide for sliding movement of the mounting rail relative to the standoff mounts. In the preferred embodiment, the opposing side edges of the attachment rail are provided with symmetrically opposed mounting channels that receive the complementary attachment rails (male track inserts). The attachment rails having an inner land portion onto which the side edge portion of the PV panel is seated. The PV panels are secured to the track inserts with rivets or other fasteners or bonded with an adhesive. The attachment rails further have an outer retaining tab which is received into the mounting channel in the mounting rail. The attachment rails and mounting rails include interfitting retaining formations to ensure that the attachment rails remains captured within the mounting channels in the mounting rails.

In an alternative embodiment, the mount system comprises a plurality of elongated mounting rails (female rails) which are secured to a substrate (i.e. geomembrane) in a parallel grid system, and attachment rails (male track inserts) secured to opposing side edges of the PV panels. In this exemplary embodiment, the attachment rails (male track inserts) are slidably received into mounting channels in opposing side edges of the parallel mounting rails (female tracks) to suspend the solar panels between the mounting rails and above the substrate. The PV panels are attached to the attachment rails by rivets, or other fasteners, or bonded with an adhesive.

In another embodiment, elongated female mounting rails are attached to a substrate with large-based rivets, and are not attached to a standoff mount. The large-based rivets are removably attached to the base of the elongated mounting rails by snapping the conical head of the rivet through a hole in the substrate and into base of the elongated rails. The elongated mounting rails are arranged in parallel relationship to each other in predetermined spacings. The predetermined spacings are determined by the widths of the PV panels such that the male attachment rails can be fastened to the opposing edges of the PV panels. The male attachment rails are removably inserted into the female receiving portion of the elongated female mounting rails in such a way that the distance between the parallel rails is spanned.

According to another embodiment of the invention, a plurality of elongated mounting rails (female rails) are secured to a substrate (i.e. geomembrane) in a parallel grid system at a location remote from the solar installation site. In this embodiment, the substrate is not the substrate 10 in FIG. 1. Large-based rivets can also be bonded to a tape carrier with a predetermined spacing so that standoff mounts can be quickly and easily installed in parallel strips onto the membrane.

In another alternative embodiment, the mount system in accordance with the teachings of the present invention further comprises a plurality of elongated mounting rails which are secured to a substrate (i.e. geomembrane) in a parallel grid system, and attachment rails secured to opposing side edges of the PV panels. In this exemplary embodiment, the attachment rails (male track inserts) are slidably received into the female receiving portion in opposing side edges of the parallel mounting rails (female tracks) to suspend the solar panels between the mounting rails and above the substrate. The elongated mounting rails are attached to the substrate with large based rivets, and are not attached to a standoff mount. The female receiving tracks can also be designated as mounting channels 132, 134.

In another embodiment of the invention, a horizontal elevated male rail is received into the female tracks of the elongated mounting rails. The elongated mounting rails and horizontal elevated male rails have interfitting locking formation to ensure that the horizontal elevated male rail remains captured within the female receiving portion of the elongated mounting rail.

In an embodiment of the invention, the elongated mounting rails have rail tray edges some distance below the female receiving portion of the elongated female mounting rails, which travel the distance of the elongated mounting rails parallel to the female receiving track. The rail tray edges are concave and face up, away from the mounting surface.

In another alternative embodiment, the mount system in accordance with the teachings of the present invention further comprises a plurality of elongated vertical mounting rails with a female receiving channel located on top of the rail. The receiving channel travels the length of the vertical mounting rail and provides a female receiving channel. On either side of the receiving channel is a locking formation (notch) which travels the distance of the vertical rail parallel to the receiving channel. Some distance below the locking formations are rail tray edges which travel the distance of the vertical rail parallel to both the receiving channel and locking formations. The rail tray edges are concave and face up, away from the mounting surface.

In another embodiment, the mount system further comprises a plurality of ballast trays with a rectilinear shape having ballast tray edges that are concave and face down toward the mounting surface. The ballast tray edges are removably set in the rail tray edges and secure the elongated vertical female rails to the mounting surface. The combination of the ballast trays with the elongated female rails provides an alternative method of securing the mount system to the substrate, as compared to using the large-based rivets. The use of the ballast trays to secure the system eliminates the necessity of penetrating the substrate. The use of the ballast trays to secure the system also permits the mounting system to be located on uneven, and even shifting surfaces, such as landfills, and/or brownfield's.

In another embodiment, the mount system further comprises a plurality of ballast trays with a rectilinear shape having ballast tray edges that are concave and face down toward the mounting surface. The ballast tray edge travels the top outer edges of the ballast trays. The ballast tray edges are removably set in the rail tray edges and secure the elongated mounting rails to the mounting surface. The combination of the ballast trays with the elongated mounting rails provides an alternative method of securing the mount system to the substrate, as compared to using the large-based rivets. The use of the ballast trays to secure the system eliminates the necessity of penetrating the substrate. The use of the ballast trays to secure the system also permits the mounting system to be located on uneven, and even shifting surfaces, such as landfills, and/or brownfield's.

In yet another embodiment, the rail tray edges receive a ballast tray edge. The ballast tray edge travels the top outer edges of the ballast trays. The ballast trays receive ballast that can be in the form of bricks, rocks, dirt, gravel, or any other medium that might be placed in the ballast tray to hold the ballast tray against the surface of the ground, membrane, roof, or any other surface upon which the mount system is placed.

In yet another embodiment of the invention, the mount system is made from a polymeric material, or a metal, or a triglass pulltrusion. Any and/or all of the elements of the various embodiments of the inventions described herein can be fabricated from non-conducting materials, such as polymers, triglass, whether they polymeric materials be made from man-made or naturally occurring monomers or other constituents. Alternatively, any and/or all of the elements of the various embodiments of the inventions described herein can be fabricated from conducting materials, such as metals and/or semiconductors and/or conducting polymers.

In another embodiment of the invention, elongated vertical mounting rails receive a vertical elevator into the female receiving channel of the elongated vertical mounting rail. On the bottom of the vertical elevator is a male vertical portion that is received into the female receiving channel of the elongated vertical mounting rail, and inward facing vertical locking portions (hooks) on opposite sides of the vertical elevator that are removably snapped into the notches of the locking formations on the same elongated vertical mounting rail. Both the male vertical portion and the vertical locking portions travel the length of the elongated vertical elevator. On top of the vertical elevator, opposite of the male vertical portion, is female receiving channel. The female receiving channel runs the length of the vertical elevator and provides a female receiving channel. On either side of the female receiving channel is a locking formation (notch) which travels the distance of the vertical elevator parallel to the receiving channel.

In yet another embodiment, vertical elevators receive vertical male rails into the female receiving channel of the vertical elevator. On the bottom of the vertical male rail is a male vertical portion that is received into the female receiving channel of the vertical elevator, and inward facing vertical locking portions (hooks) on opposite sides of the vertical male rails that are removably snapped into the notches of the locking formations on the elongated vertical elevator. The top of the vertical male rail comprises an elongated strip having an inner land portion onto which the side edge portion of the PV panel seats. At one edge of the inner land portion is a raised shoulder which facilitates alignment of the panel and the vertical male rail.

In yet another embodiment, the present invention provides a mount system for a photovoltaic panel which will allow for ease of installation, flexibility of movement, and the ability to remove and redeploy the system as needed. The mount system in accordance with the teachings of the present invention generally comprises a plurality of standoff mounts each having a base portion securable to a substrate in a linear array at a predetermined spacing, and the plurality of standoff mounts further have a neck portion extending upwardly from the base portion.

The system further includes a mounting rail having a central spine including at least one side edge and a plurality of openings arranged longitudinally along the central spine at a predetermined spacing matching the spacing of the one-piece standoff mounts. The mounting rail is supported on the neck portions of the one-piece standoff mounts above the substrate, and the mounting rail is secured to the plurality of one-piece standoff mounts. An attachment rail has an inner land portion on which an edge portion of a PV panel is secured, and further has an outer retaining tab portion.

The system further comprises a polymeric wind shield having a retaining tab portion and a shield portion extending outwardly and downwardly from the retaining tab portion. At least one side edge of the central spine of the mounting rail and the outer retaining tab portion of the attachment rail include interfitting locking formations which are removably received and secured together whereby the PV panel is removably secured to the mounting rail.

The one-piece standoff mounts comprise elastomeric materials, and at least one of the mounting rails and the attachment rails comprise polymeric materials. The mounting rails comprise a female track having opposed outwardly facing mounting channels on opposing sides of the central spine. The mounting rail may include a polymeric wire management channel. The female track may include a polymeric J-shaped wire management channel extending downwardly from an underside of one of the opposed mounting channels. The fasteners may be a threaded bolt and cap nut, the cap nut being received in the one-piece standoff mount and the threaded bolt being received through the opening in the mounting rail and into the cap nut in the one-piece standoff mount.

The substrate is an elastomeric membrane, and the mount system further comprises a plurality of annular bonding rings formed from an elastomeric membrane material and having a diameter greater than a diameter of the base portion of the one-piece standoff mounts. The elastomeric membrane annular bonding rings have a central opening which is received over the neck portion of the one-piece standoff mount, and the elastomeric membrane annular bonding rings are bonded to the elastomeric membrane to secure the one-piece standoff mounts to the elastomeric membrane.

The attachment rail comprises a male track insert having an outer retaining tab portion which is received into one of the opposed mounting channels in the female track whereby the PV panel is secured to the female track. The elastomeric membrane is a geomembrane.

In yet another embodiment, the present invention provides a mount system for a photovoltaic panel which will allow for ease of installation, flexibility of movement, and the ability to remove and redeploy the system as needed. The mount system in accordance with the teachings of the present invention generally comprises a plurality of standoff brackets secured to standoffs, or some other mount secured to a substrate, and/or a roof, in a parallel grid system, elongated rails (male tracks).

The mounting system further comprises wind shields which are utilized on the outer edges of a panel array. The wind shields have a retaining tab portion which is received into the mounting channel in the mounting rail and a shield portion which extends outwardly and downwardly to redirect air flow up and over the PV panels.

The mounting system may still further comprises a separate wire management mounting rail which includes the opposed mounting channels and further includes a J-shaped wire management channel extending downwardly from one side of the rail. Wiring is received within the hook portion of the channel.

In yet another embodiment, the present invention provides a fully integrated mount system for a photovoltaic panel, which will allow for ease of installation, flexibility of movement, and the ability to remove and redeploy the system as needed. In the context of one embodiment of the invention, nonconductive rails and components can be utilized, meaning that a variety of wiring systems can incorporate directly into the main rail and module rail/bracket. For instance, a bus bar could be incorporated into the main rail at the time of manufacture or as an additional component, and the electrical connection between the module and system would occur simultaneously with the installation of the module.

Another embodiment of the present method could be installation of a preassembled harness into the main rail that could also provide for simultaneous connection as the modules are installed. Either method could allow for a staged connection where the interface would be ready for quick connection but not necessarily connected "seamlessly" with the installation of the modules.

In yet another embodiment, the present invention provides the capability of the system to allow for higher voltages, which creates tremendous material and labor savings, thus generating far better financial performance. The present invention can provide a ⅔ savings in the engineering balance of systems (EBOS) materials costs by moving up to 1,500 Volts from the current 600 V paradigm.

In yet another embodiment, the present invention provides for an electrical connection that is made when a backrail is inserted and/or slid into an inter-fitting rail, including, but in no way limited to a short rail "clip".

In yet another embodiment, the present invention provides an electrical connection that is made when a backrail assembly, including, but in no way limited to a "key" is inserted and/or slid into an inter-fitting rail (including a short rail "clip").

Accordingly, among the objects of the instant invention is the provision of a PV panel mounting system that is inexpensive.

Another object of the invention is to provide a PV panel mounting system that is easy to install, is ultra-fast and allows the various elements to snap together, and/or to slide together, and/or to interlock through holes, crevices, vias, or any other method in which parts can be joined, and/or held, and/or fastened, and/or connected together.

Yet another object of the invention is to provide a mounting system that will allow the PV panels to be easily reconfigured, removed or replaced when needed. The full integration is "NextGen" ready.

Yet another object of the invention is to provide a mounting system that has a range of values of Voltage capacity from 0 Volts to 2,400 Volts. The Voltage range includes a 1,500 Volt capacity.

Yet another object of the invention is to provide a mounting system that has zero structural grounding requirements.

Still another object of the invention is to provide a mounting system that will allow relative movement of the PV panels and the membrane thus reducing the likelihood of damage to both the PV panels and the membrane.

Still another aspect of the invention to provide an integrated electrical and mechanical PV array interconnection system is disclosed. The system may include a module, a purlin connector, a purlin, and a PV array. In one embodiment, the module may include at least one MC4 connector. However, one having skill in the art will recognize that a plurality of connectors may be utilized. In another embodiment, a purlin may be provided having a specialized hole pattern punched into the top surface of the purlin. The specialized pattern corresponds to a plurality of protrusions on the base of the module. The protrusions extend downward through the holes in the purlin, where they snap into the purlin connector.

It is another aspect of the present invention to provide a method of integrating a PV array system. In one embodiment of the present invention, a hole pattern is created which corresponds to protrusions extending from the base of the module. The hole pattern is then punched into the top surface of a purlin. The protrusions of the module are then inserted into the holes created in the purlin, before snapping into the purlin connector. In another embodiment, two modules are utilized for each pattern punched, and are further interconnected via a port in the base of the modules.

It is yet another aspect of the present invention to provide an improved module for use in an integrated PV array system. In one embodiment, a module may be provided which includes a plurality of protrusions extending from a base of the module, adapted to be received through corresponding holes in a purlin. The module further includes a central port extending from the base the of the module, which allows for the connection of an electrical cable for connecting one module to another. The module further includes one or more connectors extending from the top surface of the module, wherein one end of the connector attaches to the central port and another end extends outward laterally from the module surface.

It is another aspect of the present invention to provide an improved purlin adapted for use with an integrated PV array system. In one embodiment, the improved purlin includes a punched pattern corresponding to the unique design of a PV array module and purlin connector which allow the system to snap into place on the purlin.

It is yet another aspect of the present invention to provide a mount system for a photovoltaic panel including at least one module having a first side and a second side, the first side adapted to support a photovoltaic panel and the second side comprising at least two downwardly extending protrusions and at least one downwardly extending electrical connector and further including a purlin connector having a plurality of protrusion apertures adapted to receive the at least two downwardly extending protrusions and at least one electrical aperture adapted to receive the at least one downwardly extending electrical connector.

It is yet another aspect of the present invention to provide a method of mounting a photovoltaic panel, the method having the steps of forming an aperture pattern into a purlin having a first side and a second side to create a patterned purlin; providing a module, the module having a first side and a second side, the first side adapted to support a photovoltaic panel and the second side comprising at least two downwardly extending protrusions and at least one downwardly extending electrical connector, wherein the position of the at least two downwardly extending protrusions and at least one downwardly extending electrical connector correspond to the aperture pattern of the patterned purlin; inserting the at least two downwardly extending protrusions and at least one downwardly extending electrical connector through the first side of the patterned purlin; providing a purlin connector having a plurality of protrusion apertures adapted to receive the at least two downwardly extending protrusions and at least one electrical aperture adapted to receive the at least one downwardly extending electrical connector; and interlocking the purlin connector with the at least two downwardly extending protrusions and at least one downwardly extending electrical connector of the module such that the purlin connector is in contact with the second side of the patterned purlin.

For written description and enablement support for various embodiments, the following are incorporated herein by this reference in their entireties: U.S. Pat. No. 6,360,491 to Ullman, U.S. Patent Publication No. 2012/0233958 A1 to Stearns; WO 2010/082653 A1 to Capati et al.; U.S. Pat. No. 7,956,280 B2 to Kobayoshi; U.S. Patent Publication No. 2013/192150 A1 to DuPont et al.; U.S. Patent Publication No. 2014/290155 A1 Conger; U.S. Pat. No. 8,039,733 B2 to Kobayashi; U.S. Pat. No. 7,987,641 to Cinnamon; U.S. Pat. No. 7,832,157 to Cinnamon; U.S. Pat. No. 7,866,098 to Cinnamon; U.S. Pat. No. 7,406,800 to Cinnamon et al; U.S. Pat. No. 8,938,919 to Cinnamon et al; Canadian Pat. No. 2,762,078 to Markowitz; U.S. Patent Publication No. 2015/0013756 to West et al; U.S. Patent Publication No. 2014/0360562 to Hartelius; U.S. Patent Publication No. 2014/0220834 to Rizzo; U.S. Pat. No. 8,303,357 to Kuwahara; U.S. Pat. No. 8,475,185 to Rivera et al; U.S. Pat. No. 8,092,129 to Haney; U.S. Patent Publication No. 20110151703 to Parker; U.S. Pat. No. 5,451,167 to Zielinski; U.S. Patent Publication No. 20110151703 to Parker et al; U.S. Pat. No. 4,993,959 to Randolph; and European Pat. No. 0544625 A1 to Lorenz.

Other objects, features and advantages of the invention shall become apparent as the description thereof proceeds when considered in connection with the accompanying illustrative drawings.

BRIEF DESCRIPTION OF THE DRAWINGS

In the drawings which illustrate the best mode presently contemplated for carrying out the present invention:

FIG. 3 is a perspective view of a standoff mount constructed in accordance with the teachings of the present invention;

FIG. 4 is a top view thereof;

FIG. 5 is a cross-sectional view thereof taken along line 5-5 of FIG. 4;

FIG. 6 is a cross-sectional end view of a female mounting rail and male attachment rail constructed in accordance with the teachings of the present invention;

FIG. 6 is a top view thereof;

FIG. 7 is a cross-sectional view of the complete mounting system attached to a geomembrane;

FIG. 8 is a cross-sectional end view of a female mounting rail and a wind shield;

FIG. 9 is a cross-sectional view of the mounting system including the wind shield attached to a geomembrane;

FIG. 12 is a top view of an annular bonding ring in accordance with the invention;

FIGS. 52A-52C show perspective views of an integrated PV array interconnection system according to one embodiment of the present invention (this figure is to scale);

FIGS. 53A-53C show a bottom view of an integrated PV array interconnection system according to one embodiment of the present invention (this figure is to scale);

FIGS. 54A-54B show perspective views of modules including male and female MC4 connectors according to one embodiment of the present invention (this figure is to scale);

Figure 1:
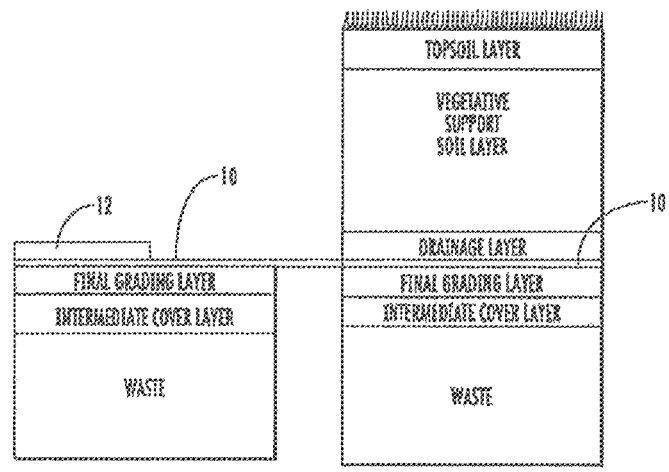
FIG. 1 is an illustration of two prior art landfill cover systems.
Figure 2:
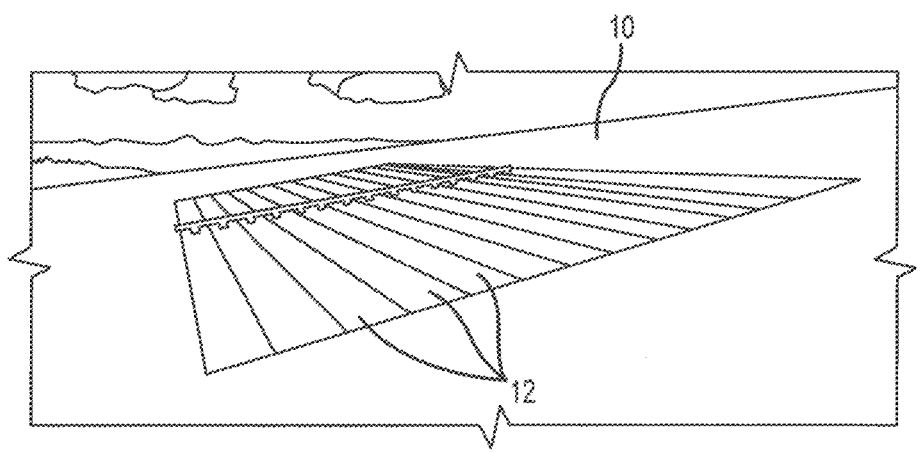
FIG. 2 is an image of a prior art exposed geomembrane cover system having flexible laminate solar panels adhered directly to the surface of the membrane.

It should be understood that the drawings are not necessarily to scale (those that are to scale are so noted.) In certain instances, details that are not necessary for an understanding of the invention or that render other details difficult to perceive may have been omitted. It should be understood, of course, that the invention is not necessarily limited to the particular embodiments illustrated herein.

DETAILED DESCRIPTION OF THE PREFERRED EMBODIMENT

The present invention provides a unique and novel, low-cost PV array mount system which will allow for ease of installation, flexibility of movement, and the ability to remove and redeploy the system as needed.

Before proceeding with the description, it is to be understood that the mount system herein is capable of being used with all types of photovoltaic (PV) panels 100, including flexible PV panels, as well as rigid PV panels, regardless of the length or width of the panels. The system has the flexibility to be deployed in virtually any configuration. It is also noted that the electrical systems that accompany the PV panels 100 are generally well known in the art, and will not be described in detail herein, albeit there will be mention of the mount system accommodating the required wiring of the panels.

Referring to FIGS. 3-12, the mount system in accordance with the teachings of the present invention generally comprises a plurality of standoff mounts 102 (FIGS. 3-5) which are secured to a substrate 10 (i.e. geomembrane) in a parallel grid system, elongated mounting rails 104 (FIG. 6) which are secured to the standoff mounts 102 in parallel, and attachment rails 106 secured to opposing side edges of the PV panels 100. The terms mounting rails and attachment rails are intended to define the relative placement of the rails in the system and it should be understood that these rails could be male or female depending on the application. While the exemplary embodiment illustrated herein is a female track and a male track insert, the disclosure should not be limited to only that arrangement. The shapes of the mounting rails and attachment rails can vary extensively and are determined by the requirements of the specific array. In the exemplary embodiment, the attachment rails (male track inserts) 106 are slidably received into mounting channels in opposing side edges of the parallel mounting rails (female tracks) 104 to suspend the solar panels 100 between the mounting rails 104 and above the substrate 10 (See FIG. 7).

For purposes of illustration and description, the preferred embodiments herein will be described in connection with mounting to an elastomeric membrane 10, such as a geomembrane, covering a brownfield or landfill. However, it should be appreciated that the mount system can also be deployed on other membrane covered substrates, such as the roofs of buildings or vehicles. In addition, other mounting options will be described for non-membrane covered substrates.

Referring back to FIGS. 3-5, the standoff mounts 102 include a base portion 108, a neck portion 110 extending upwardly from the base portion 108 and a fastener 112/114 received in the neck portion. In the exemplary embodiment as illustrated, a threaded cap nut 112 is inserted or molded into the top of the neck portion 110 for receiving a threaded fastener 114. Alternatively, the threaded fastener 114 could be inserted or molded into the top of the neck portion 110 and the cap nut 112 received onto the fastener. In addition, a variety of additional types of fasteners 112/114 are also possible within the scope of the disclosure. Even further still, it is contemplated that fastener elements may be directly incorporated into the mounting rails 104 for direct attachment of the mounting rails 104 to the standoff mounts 102.

The standoff mounts 102 can be manufactured in a variety of shapes as dictated by the attachment application and can be made from rigid or elastomeric materials, also as dictated by the attachment application. Where an elastomeric material is used for the standoff mounts 102 it allows the neck portions 110 thereof to flex under stress and provides a fair amount of flexibility of movement while maintaining a consistent grid array. The preferred shape as illustrated is a cone with a large bottom surface to provide structural stability and provide a securing platform.

Referring to FIGS. 7 and 12, the standoff mounts 102 can be secured to the membrane using a plurality of different attachment methods including, but not limited to adhesive bonding, ultrasonic welding, or annular bonding rings. In the exemplary embodiment as illustrated, the standoff mounts 102 are secured to the membrane 10 using an annular bonding ring 116 having a central opening 118. The bonding ring 116 has a diameter greater than the base portion 108 and is made of a material that is the same as or similar to the membrane material so that the bonding ring 116 can be bonded to the membrane 10. For example, the bonding ring material could comprise an engineered membrane of TPO, PP, PE, EPDM or other suitable materials that are capable of being bonded to the underlying membrane.

In use, the bonding ring 116 is received over the neck portion 110 of the standoff mount 102 and is bonded to the membrane 100 using conventional membrane bonding materials or methods, thereby trapping the base portion 108 and holding it in place (see FIG. 7).

Figures 11A, 11B, 11C:
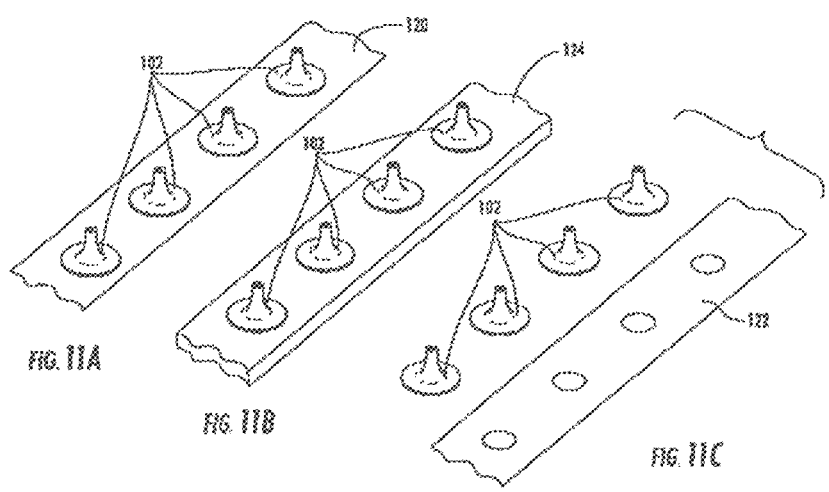
FIG. 11A is a perspective view of a plurality of standoff mounts attached to a carrier tape.
FIG. 11B is a perspective view of a plurality of standoff mounts attached to a carrier strapping.
FIG. 11C is a perspective view of an attachment system including plurality of standoff mounts and a bonding tape including a plurality of spaced openings.

Referring to FIG. 11A, the base portions 108 of the standoff mounts 102 can also be bonded to a tape carrier 120 with a predetermined spacing so that the standoff mounts 102 can be quickly and easily installed in parallel strips onto the membrane 10. The tape carrier 120 is preferably made from the same material or similar material to the membrane 10 so that the tape carrier 120 can be easily bonded to the membrane 10. Alternatively, a tape strip 122 can be provided with a plurality of holes formed at predetermined spacing (See FIG. 11C) wherein the standoff mounts 102 are inserted through the holes and the base portions 108 thereof held beneath the tape strip 122. The tape strip 122 is also preferably made from the same material or similar material to the membrane 10 so that the tape strip 122 can be easily bonded to the membrane 10.

Still further, the standoff mounts 102 can also be bonded to a more rigid carrier strapping 124 (FIG. 11B) which can be used in other mounting configurations where the strapping 124 can be secured to any rigid underlying substrate, such as a building roof, concrete slab, or a vehicle roof with fasteners (not shown).

Referring now to FIGS. 6 and 7, the mounting rail 104 includes an elongated spine 126 having a plurality of holes 128 and/or elongated slots 130 paced longitudinally along the centerline. In use, the standoff mounts 102 are spaced to match the spacing of the holes/slots in the mounting rail 104. When installed, the holes/slots align with the standoff mounts 102 and fasteners 114 (FIG. 7) are inserted through the holes/slots into the cap nuts 112 in the tops of the neck portions 110. The elongated slots 130 provide for longitudinal sliding movement of the tracks 104 relative to the standoff mounts 102. In another alternative (not shown) it is contemplated that the insert of the standoff mount 102 may include a swivel arm (not shown) that would rotate relative to the neck portion 110 to provide further range of motion if needed. At least one side of the mounting rail 104 is provided with a mounting channel for receiving the attachment rail 106. In the exemplary embodiment, the opposing side edges of the mounting rail 104 are provided with symmetrically opposed mounting channels 132, 134 that receive the complementary attachment rails 106.

The attachment rail 106 generally comprises an elongated strip having an inner land portion 136 onto which the side edge portion of the PV panel 100 is seated. The PV panels 100 are secured to the land portions 136 of the attachment rails 106 with rivets 138 or other fasteners or bonded with an adhesive. Alternatively, the attachment rails 106 can be integrated into the construction of the PV panels, or can be integrated into a support carrier (not shown) for the PV panel 100. The attachment rails 106 further include an outer retaining tab portion 140 which is received into the mounting channel 132,134 in the mounting rail 104. Separating the land portion 136 from the tab portion 140 is a raised shoulder 142 which facilitates alignment of the attachment rail 106 with the panel 100 and the mounting rail 104. The attachment rail 106 and mounting channels 132, 134 include interfitting locking formations (hooks) 144A,144B to ensure that the attachment rail 106 remains captured within the mounting channels 132,134.

The mounting rail 104 and attachment rail 106 are made from polymeric materials, triglass, metal or both and include a low friction covering or additive allowing for free movement of the attachment rail 106 relative to the mounting rail 104. The depth of the channel 132,134 is variable depending on the desired ability of the attachment rail 106 to slide freely inward and outward from the centerline of the mounting rail 104. The attachment rail 106 is also able to slide longitudinally along the length of the channel 132,134. The height of the channel 132,134 is also variable and should be loose enough to allow for movement but also tight enough to ensure that the attachment rail 106 remains captured within the channel 132,134. The top wall of the channel 132,134 should be thin enough to allow the attachment rail 106 to be snapped into place (some degree of flex) but thick enough to prevent breaking during installation. It is also noted that the shape of the retaining "tooth" or "hook" 144 should not be limited by the attached illustrations. Other shapes and configurations of interfitting parts are also within the scope of the invention. Even further still, it is contemplated that the retaining "hook" 144 may be machined directly into the side edge of the PV panel eliminating the need for the attachment rail 106 altogether.

Turning to FIG. 7, an end view of the system is shown as it may be typically deployed on a landfill geomembrane 10. The standoff mounts 102 are spaced as required and secured to the geomembrane 10 with bonding rings 116. Thereafter, the mounting rails 104 are secured to the standoff mounts 102 in parallel. The holes/slots in the mounting rails 104 are aligned with the standoff mounts 102 and the fasteners 114 are inserted through the holes/slots and secured to the standoff mounts 102. As seen in FIG. 7, the mounting rails 104 are elevated above the membrane 10. The attachment rails 106 are attached to the PV panels 100 in the factory or at a staging site. The PV panels 100 are then snapped into the mounting channels 132,134 of the parallel rails 104 to hold the PV panels 100 in position. Elevating the PV array above the membrane 10 separates movement of membrane 10, due to whatever reason, i.e. expansion, contraction shifting, from the array. The standoff mounts 102 buffer any resulting movement. Elevating the PV array also allows air to flow freely beneath the array serving to keep the panels 100 and the underlying membrane 10 cooler.

To reduce wind stresses on the system, an L-shaped wind shield 146 (See FIGS. 8 and 9) is provided and assembled with the outermost mounting rail 104 of the array. In the exemplary embodiment, the wind shields 146 having a retaining tab portion 148 which is received into the outer mounting channel 134 in the mounting rail 104 and a shield portion 150 which extends outwardly and downwardly to redirect air flow 152 up and over the array. The wind shield 146 could also be molded directly into an alternate design of the track (not shown) that would only be used as an outside edge.

Wiring (not shown) between adjacent panels 100 and wiring to a control system (not shown) can be fed beneath the elevated panels 100 or can be secured in conduits (now shown) that snap together with the mounting rails 104.

Figure 10:
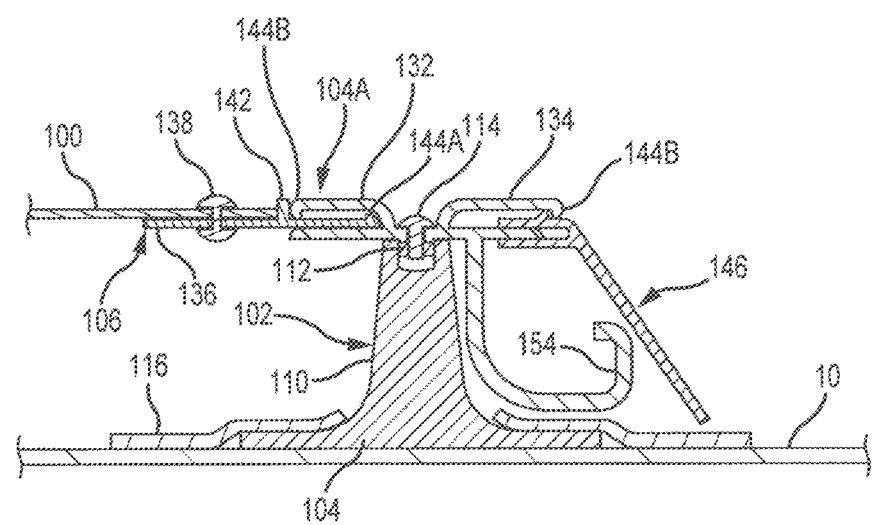
FIG. 10 is a is a cross-sectional view of the mounting system including the wire management rail and a wind shield attached to a geomembrane.

As illustrated in FIG. 10, the mount system may still further include a separate wire management rail 104A which includes the opposed mounting channels 132,134 and further includes a J-shaped wire management channel 154 extending downwardly from one side of the mounting rail 104. Wiring may be received within the hook portion of the J-shaped channel 154.

It is noted that the illustrated embodiments represent only two adjacent rows of panels 100 and tracks 104, but it is to be understood that the system can be expanded to implement an indefinite number of rows within the space of the membrane 10 or other substrate.

In the event of failure of or damage to a panel 100, it is very simple to remove a single panel 100 from the system by simply snapping the insert 106 out of the track 104, disconnecting the wiring and then replacing the damaged panel 100 with another new panel.

In an alternative embodiment, the mount system in accordance with the teachings of the present invention further comprises a plurality of elongated mounting rails (FIG. 13) which are secured to a substrate 10 (i.e. geomembrane) in a parallel grid system, and attachment rails 106 secured to opposing side edges of the PV panels 100. In this exemplary embodiment, the attachment rails (male track inserts) 106 are slidably received into mounting channels in opposing side edges of the parallel mounting rails (female tracks) to suspend the solar panels 100 between the mounting rails and above the substrate 10 (See FIG. 13). The elongated mounting rails are attached to the substrate 10 with large based rivets, and are not attached to a standoff mount 102.

In another alternative embodiment, the mount system in accordance with the teachings of the present invention further comprises a plurality of elongated mounting rails 104 (FIG. 13) which are secured to a substrate 10 (i.e. geomembrane) in a parallel grid system, and attachment rails 106 secured to opposing side edges of the PV panels 100. In this exemplary embodiment, the attachment rails (male track inserts) 106 are slidably received into mounting channels in opposing side edges of the parallel mounting rails (female tracks) 104 to suspend the solar panels 100 between the mounting rails 104 and above the substrate 10 (See FIG. 13). The elongated mounting rails are attached to the substrate 10 with large based rivets, and are not attached to a standoff mount 102.

Figure 14:
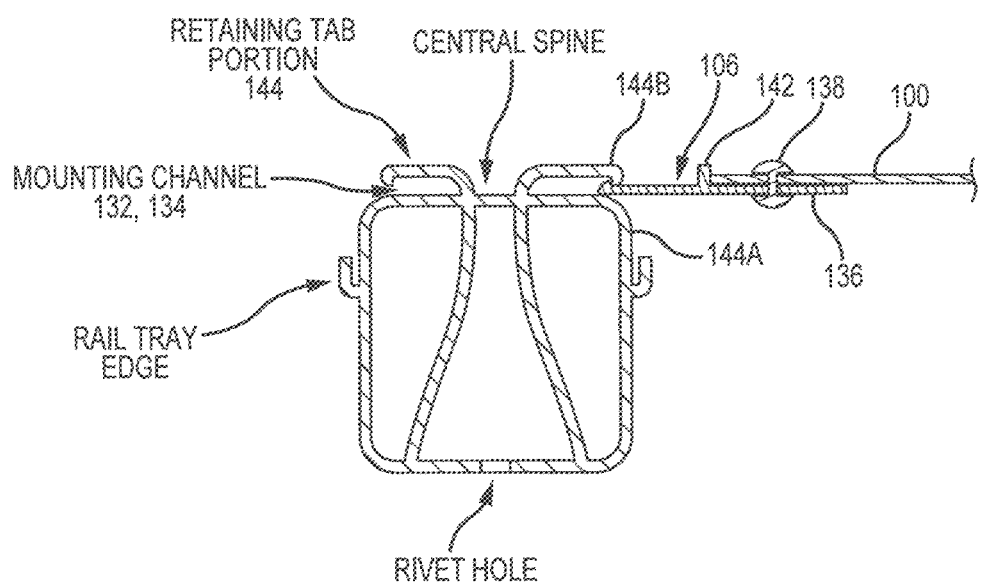
FIG. 14 is a cross-sectional view of one embodiment of the mounting system incorporating an elongated mounting rail (female rail)
Figure 15:
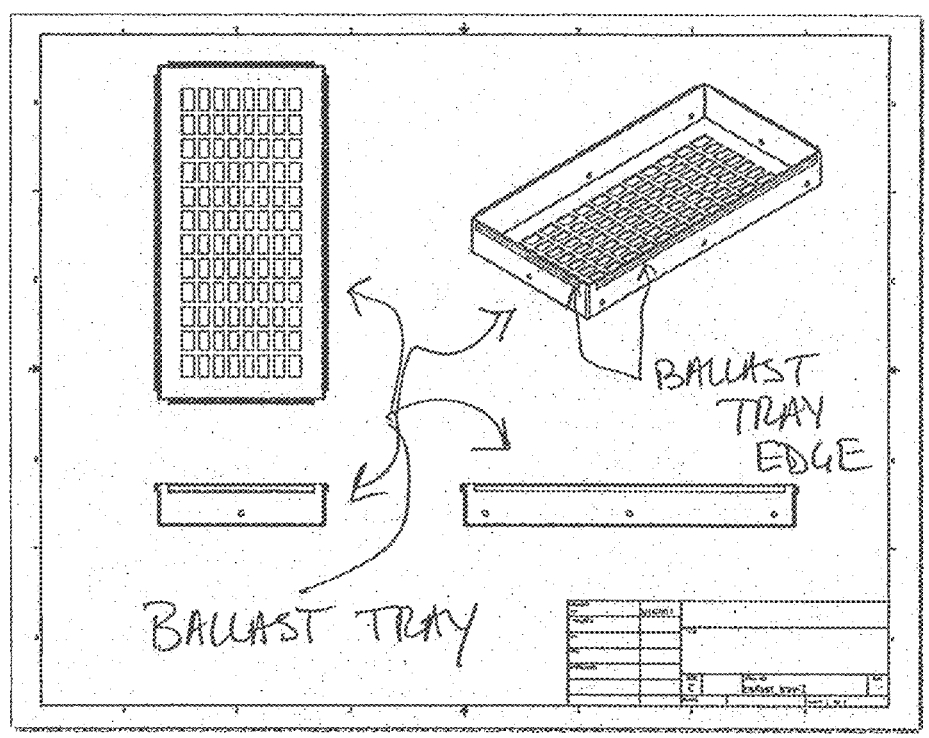
FIG. 15 is an illustration of a ballast tray.
Figure 18:
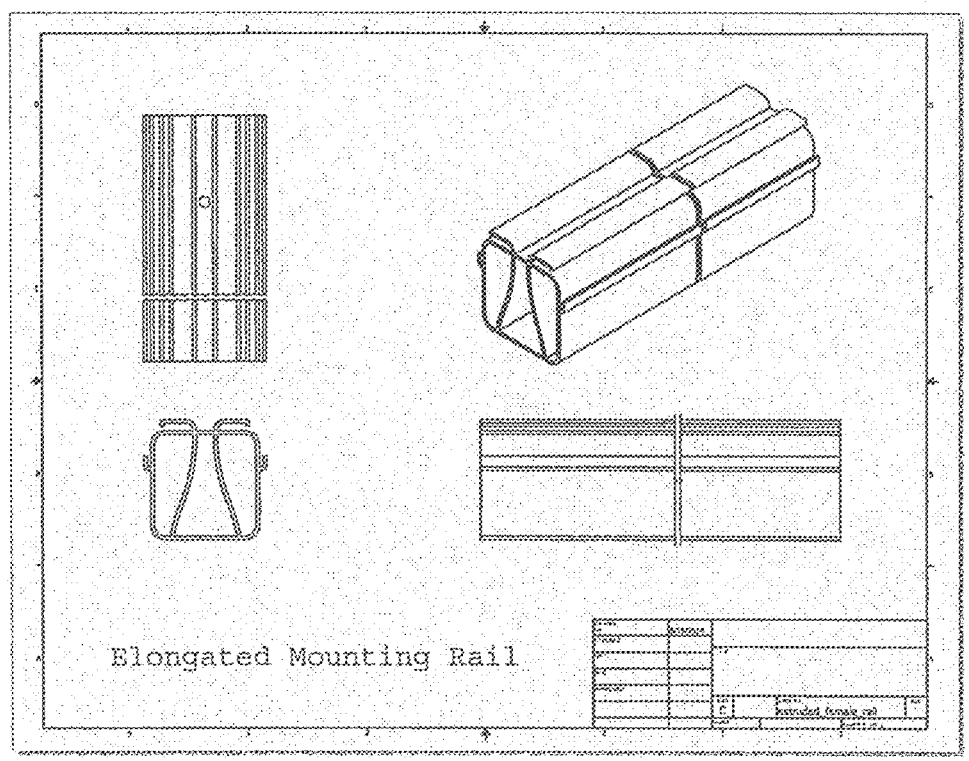
FIG. 18 is an illustration of an elongated mounting rail.

In another alternative embodiment, the mount system in accordance with the teachings of the present invention further comprises a plurality of elongated mounting rails 104 (FIGS. 14 and 18) which are secured to a substrate 10 (i.e. geomembrane) in a parallel grid system by means of ballast trays. The ballast tray edge on the rim of the ballast tray, shown in FIG. 15, is removably placed in the rail tray edge of the elongated mounting rail of FIGS. 14 and 18 whereby the parallel grid of elongated mounting rails is held to the substrate by the ballast trays. The substrate may be a ground-based membrane, or a membrane on a roof, or any other surface.

Figure 13:
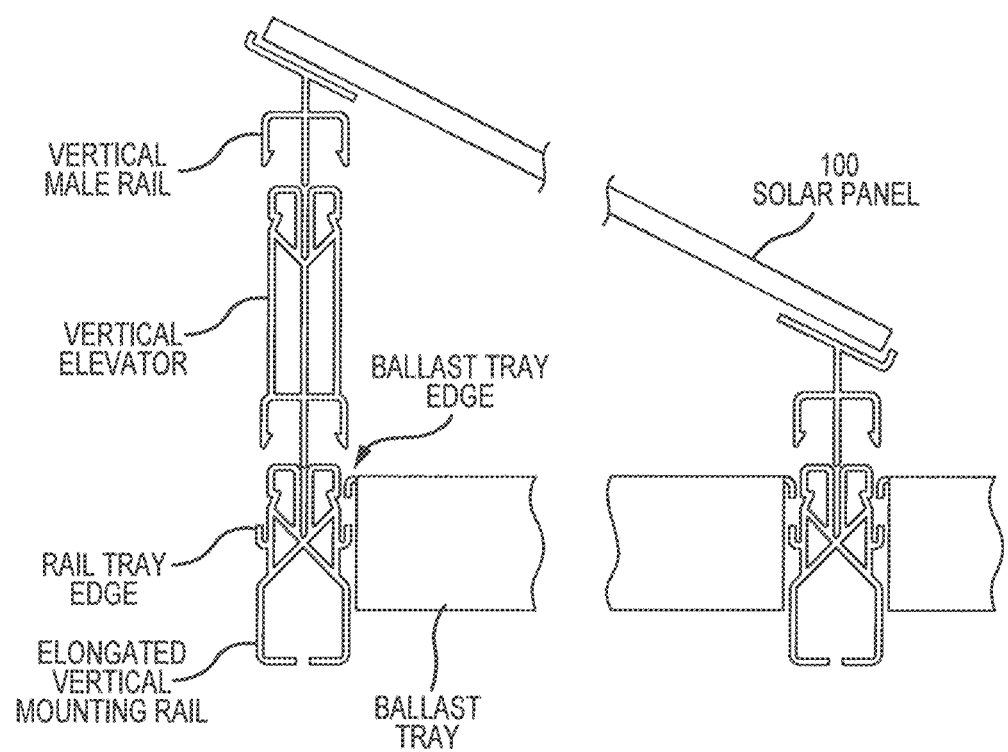
FIG. 13 is a cross sectional view of another embodiment of the complete mounting system including the ballast trays attached to a geomembrane.
Figure 16:
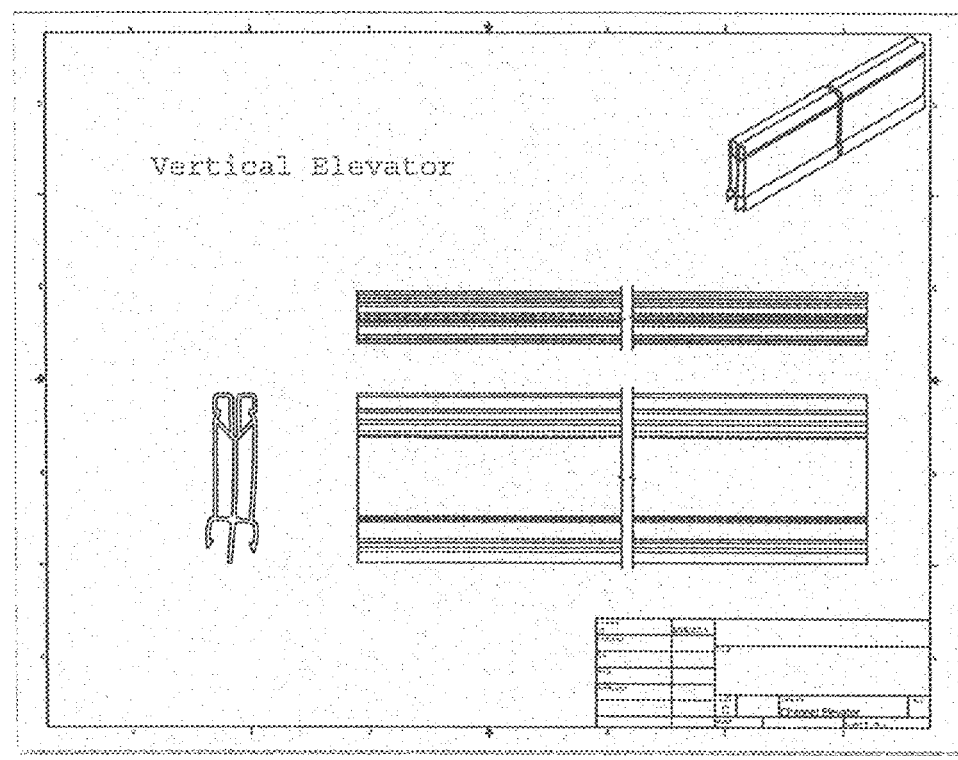
FIG. 16 is an illustration of a vertical elevator.
Figure 17:
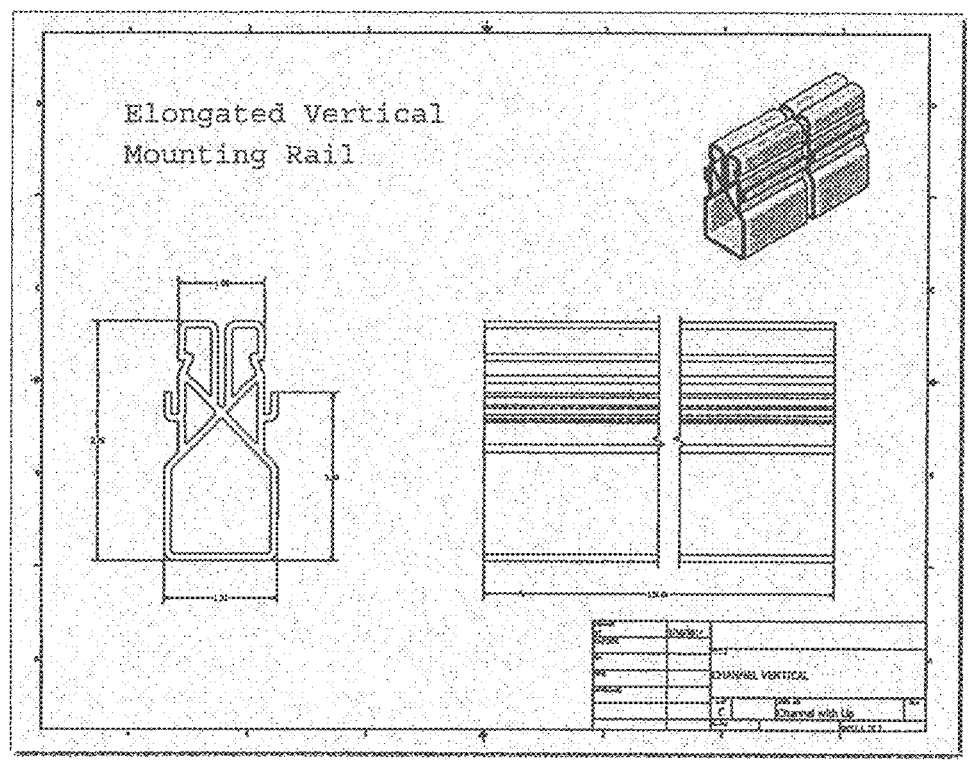
FIG. 17 is an illustration of a an elongated vertical mounting rail.
Figure 19:
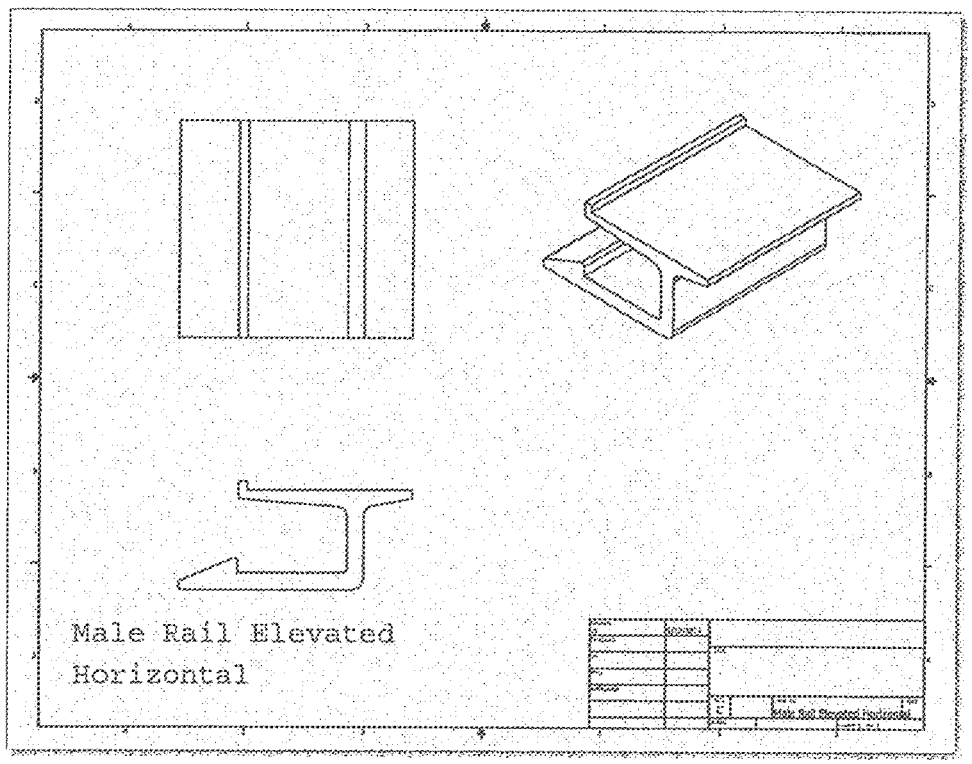
FIG. 19 is an illustration of a male rail elevated horizontal.
Figure 20:
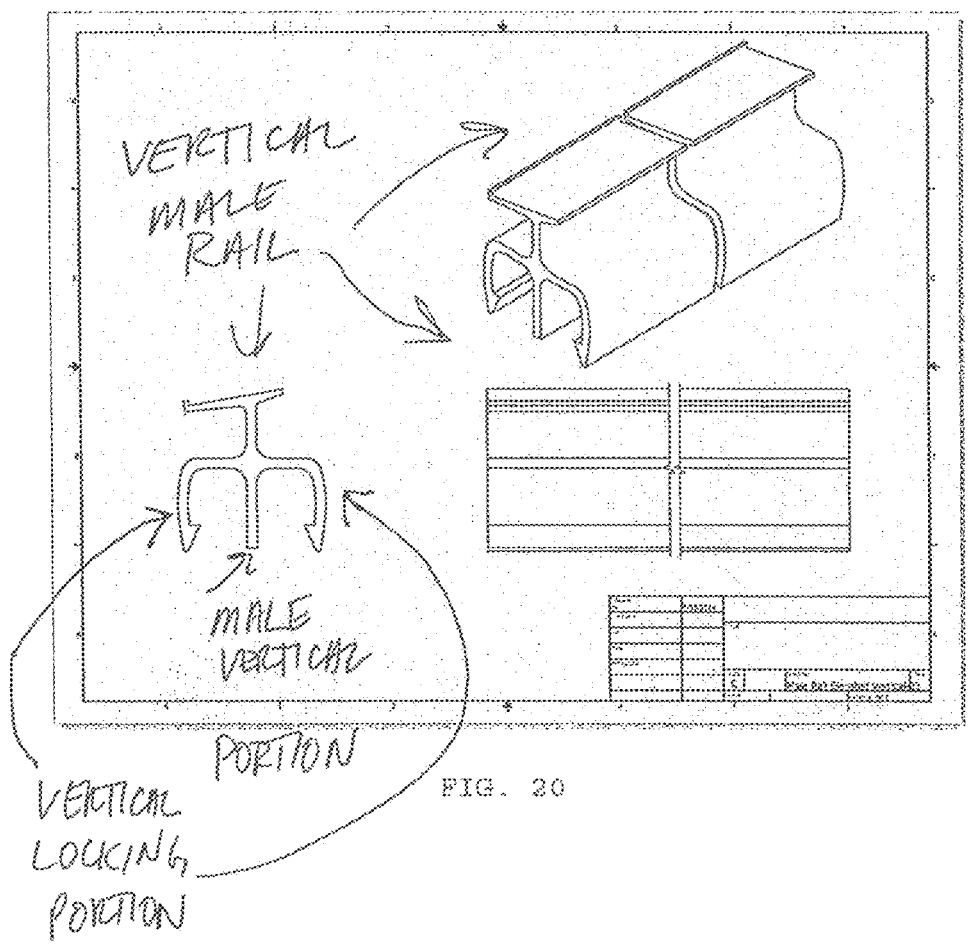
FIG. 20 is an illustration of a vertical male rail.
Figure 21:
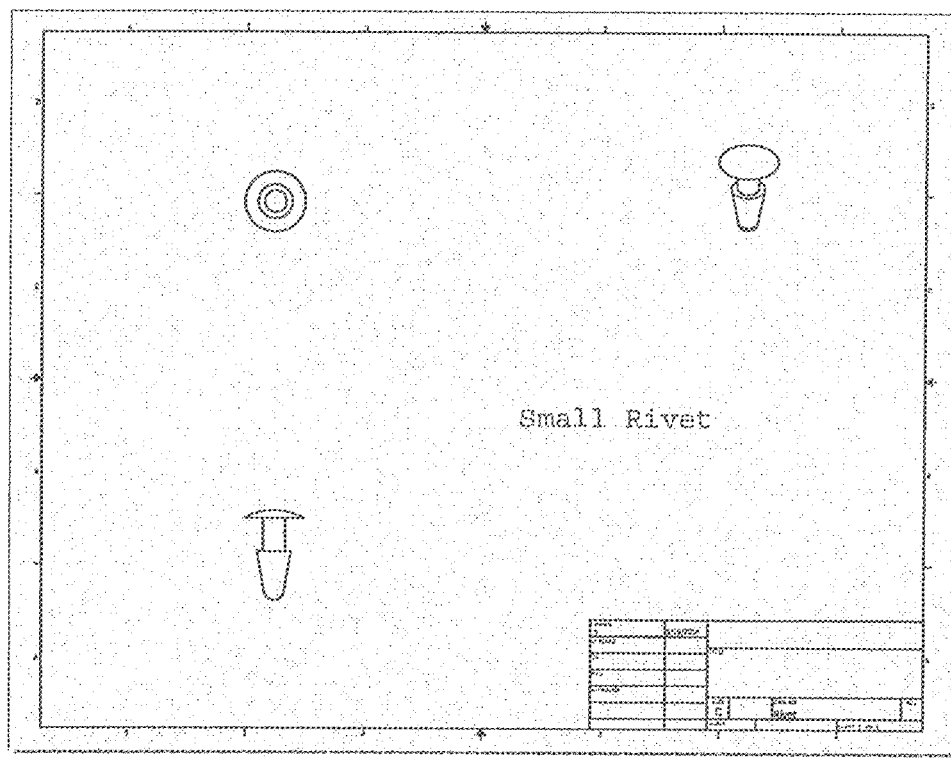
FIG. 21 is an illustration of a small rivet.
Figure 22:
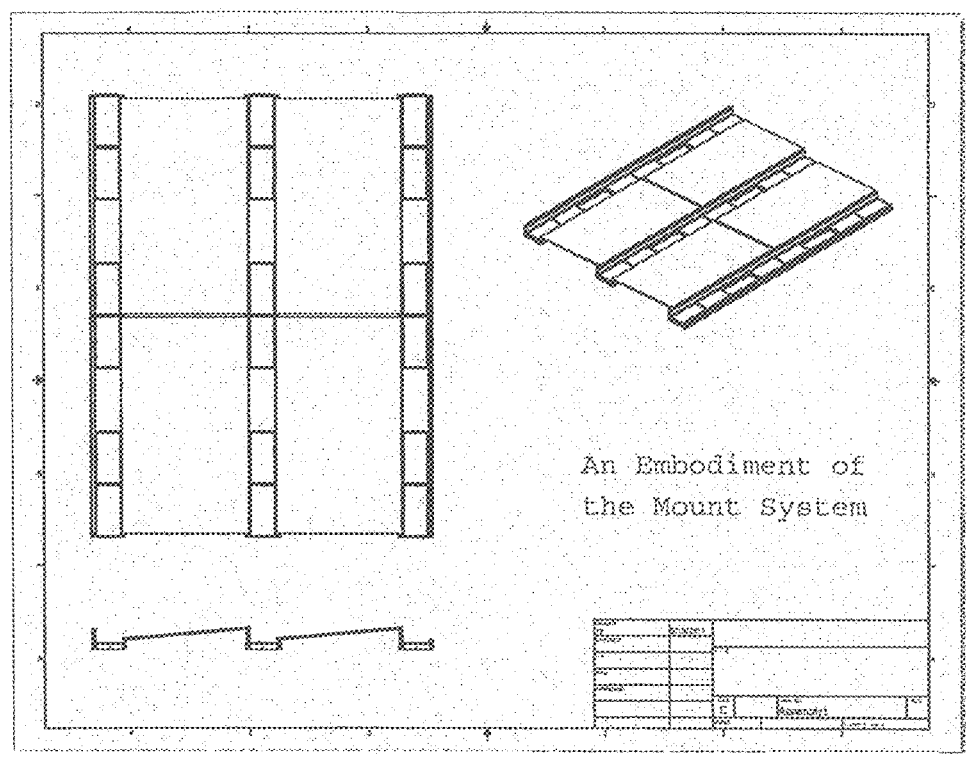
FIG. 22 is an illustration of another embodiment of the mounting system.
Figure 23:
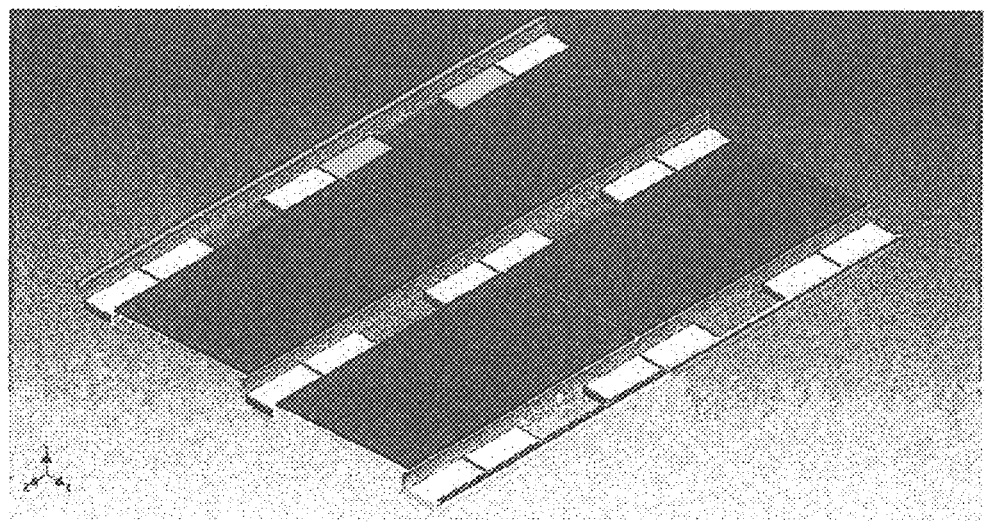
FIG. 23 is an illustration of another embodiment of the mounting system.
Figure 24:
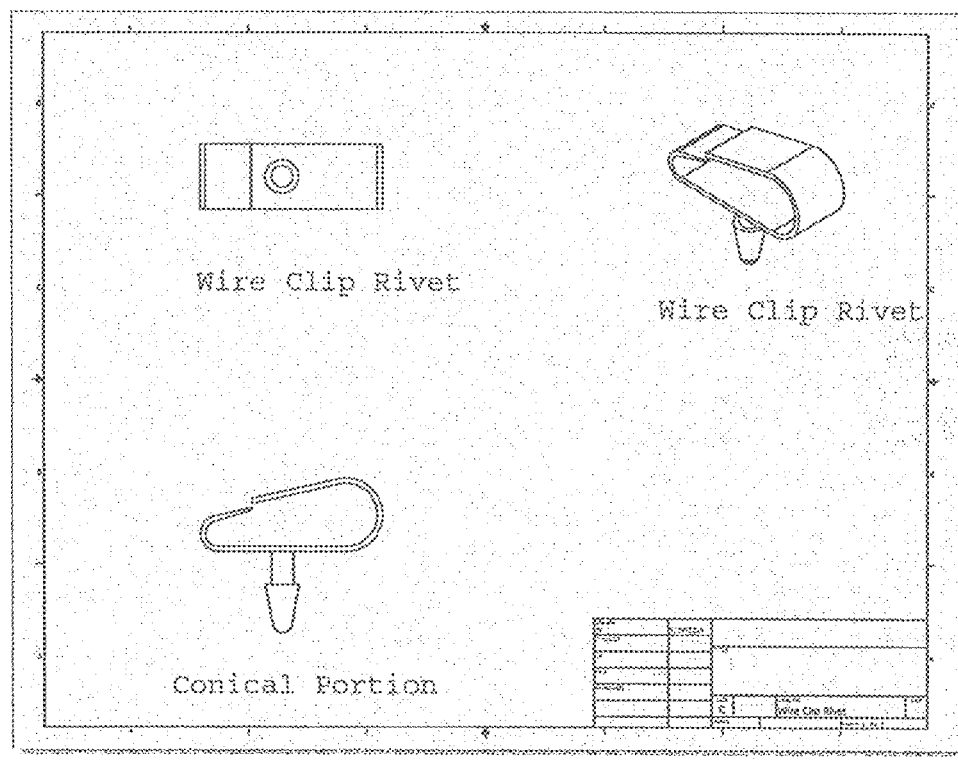
FIG. 24 is an illustration of a wire clip rivet.
Figure 25:
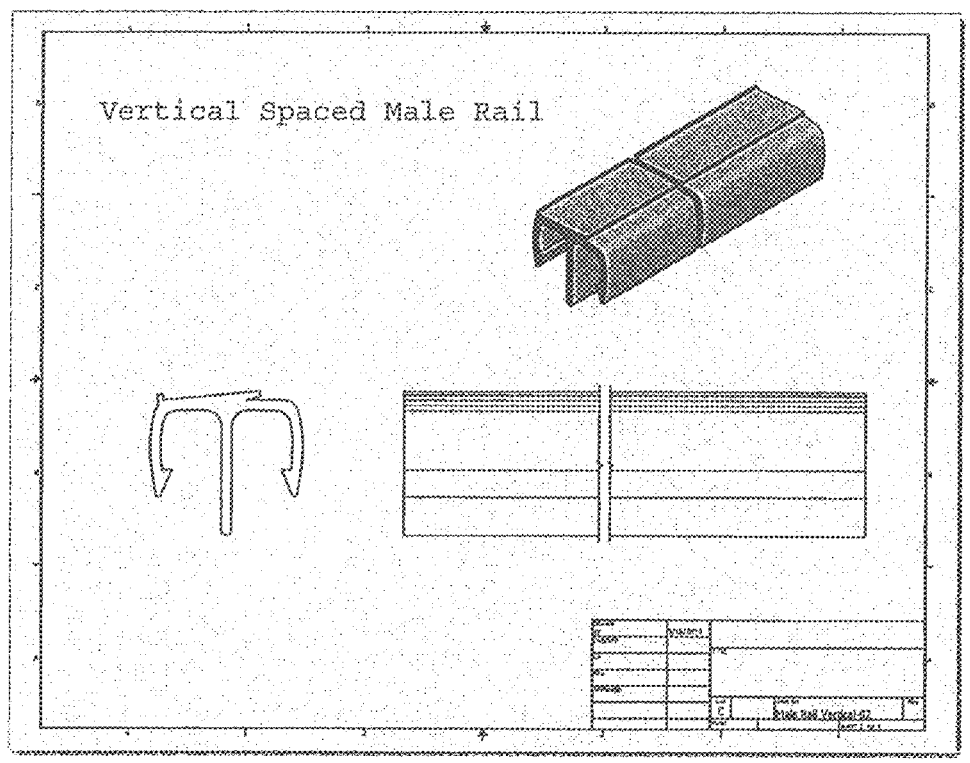
FIG. 25 is an illustration of a vertical spaced mail rail.
Figure 26:
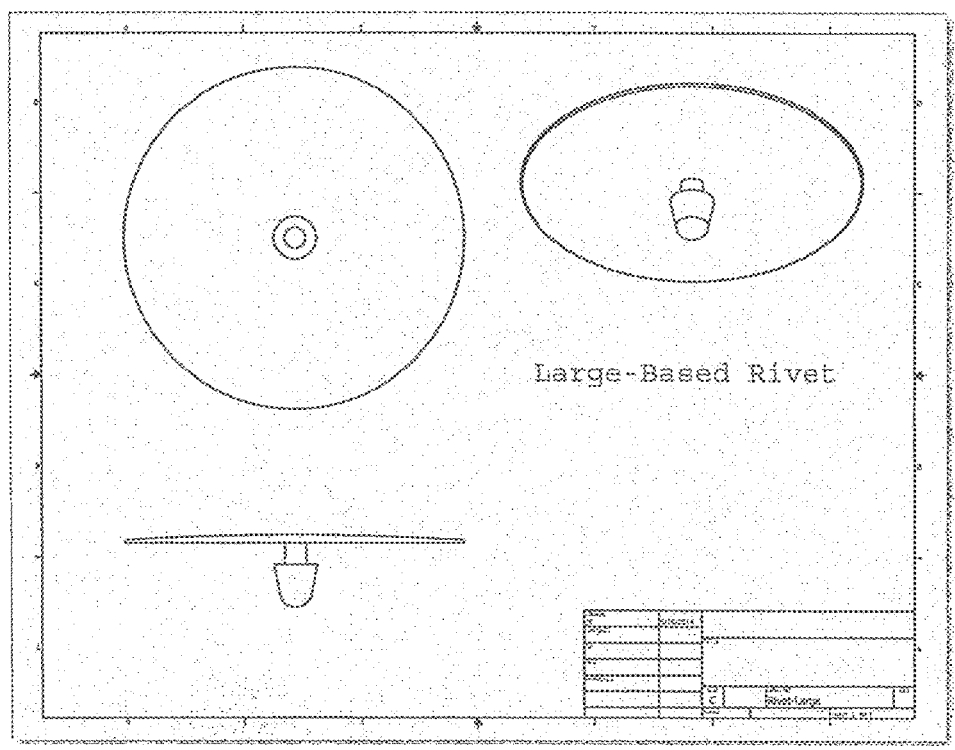
FIG. 26 is an illustration of a large-based rivet.
Figure 43:
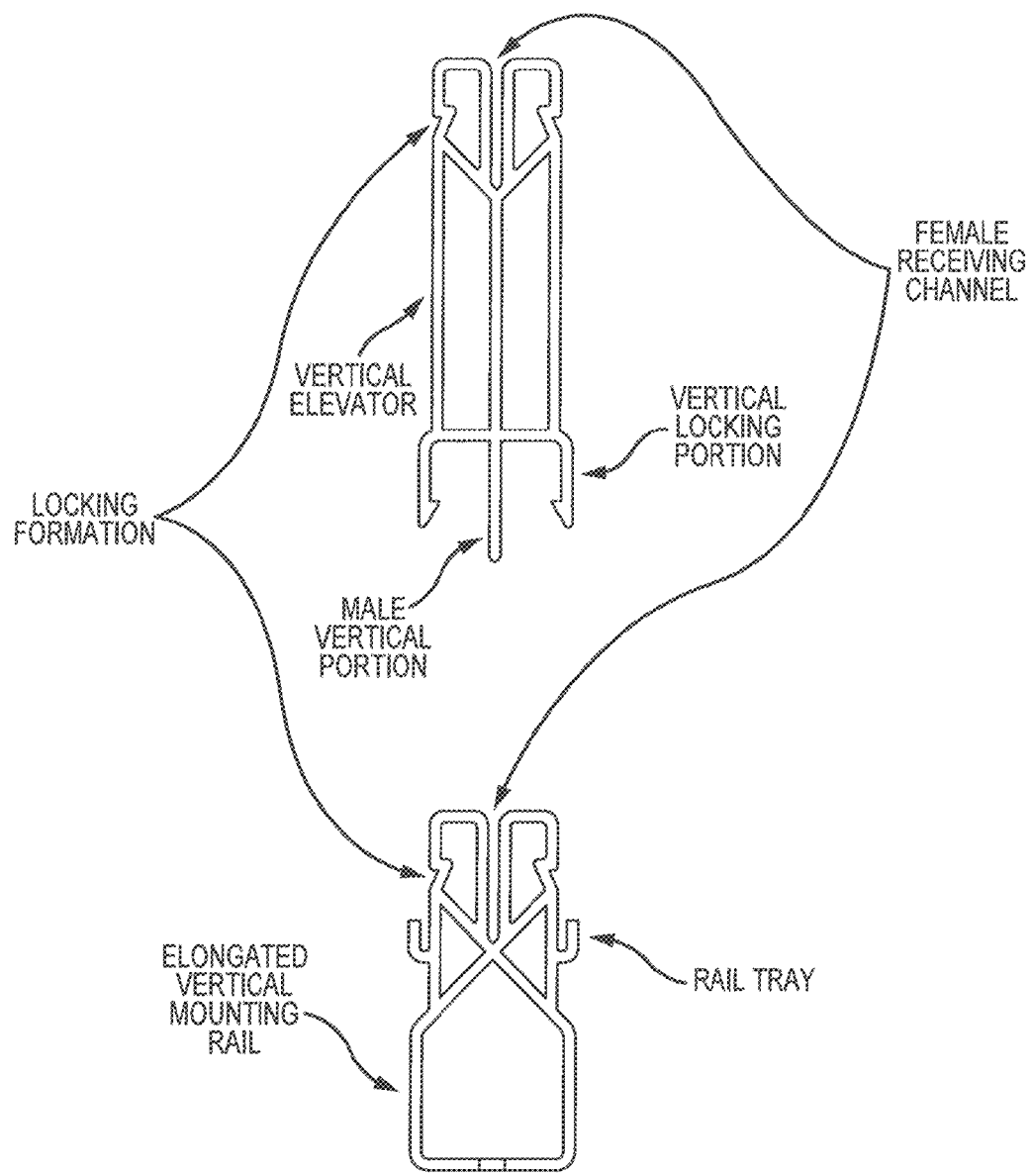
FIG. 43 is an illustration of an elongated vertical mounting rail and a vertical elevator.

Turning to FIG. 13, a cross sectional view of another embodiment of a complete mounting system including the ballast trays attached to a geomembrane is shown. Further views of various components are shown in FIGS. 15 to 26, and FIG. 43. FIG. 15 is an illustration of a ballast tray, with the ballast tray edges identified on the upper edges of the ballast tray. FIG. 16 is an illustration of a vertical elevator, which in one embodiment is connected to the elongated vertical mounting rail, as illustrated in FIGS. 13 and 17. FIG. 43 provides identification of the elements of the rails and elevators, such as the male vertical portions, and vertical locking portions, the female receiving channel, as well as the rail tray edges. FIGS. 19, 20, and 25 provide illustrations of several types of male rails, such as the male rail elevated horizontal rail of FIG. 19, and the vertical male rail of FIG. 20, and the vertical spaced mail rail of FIG. 25. FIG. 21 provides an illustration of a small rivet, which can fasten together various parts of the mounting system. FIGS. 22 and 23 provide additional illustration of other embodiments of the mounting system. Wires can be safely and conveniently stored and stowed using a wire clip rivet, as illustrated in FIG. 24. The large-based rivet which can be used to attach the elongated mounting rail and the elongated vertical mounting rail to the geomembrane are illustrated in FIG. 26. These descriptions in no way limit the range of uses and methods with which the system can be deployed and/or assembled.

Figure 27:
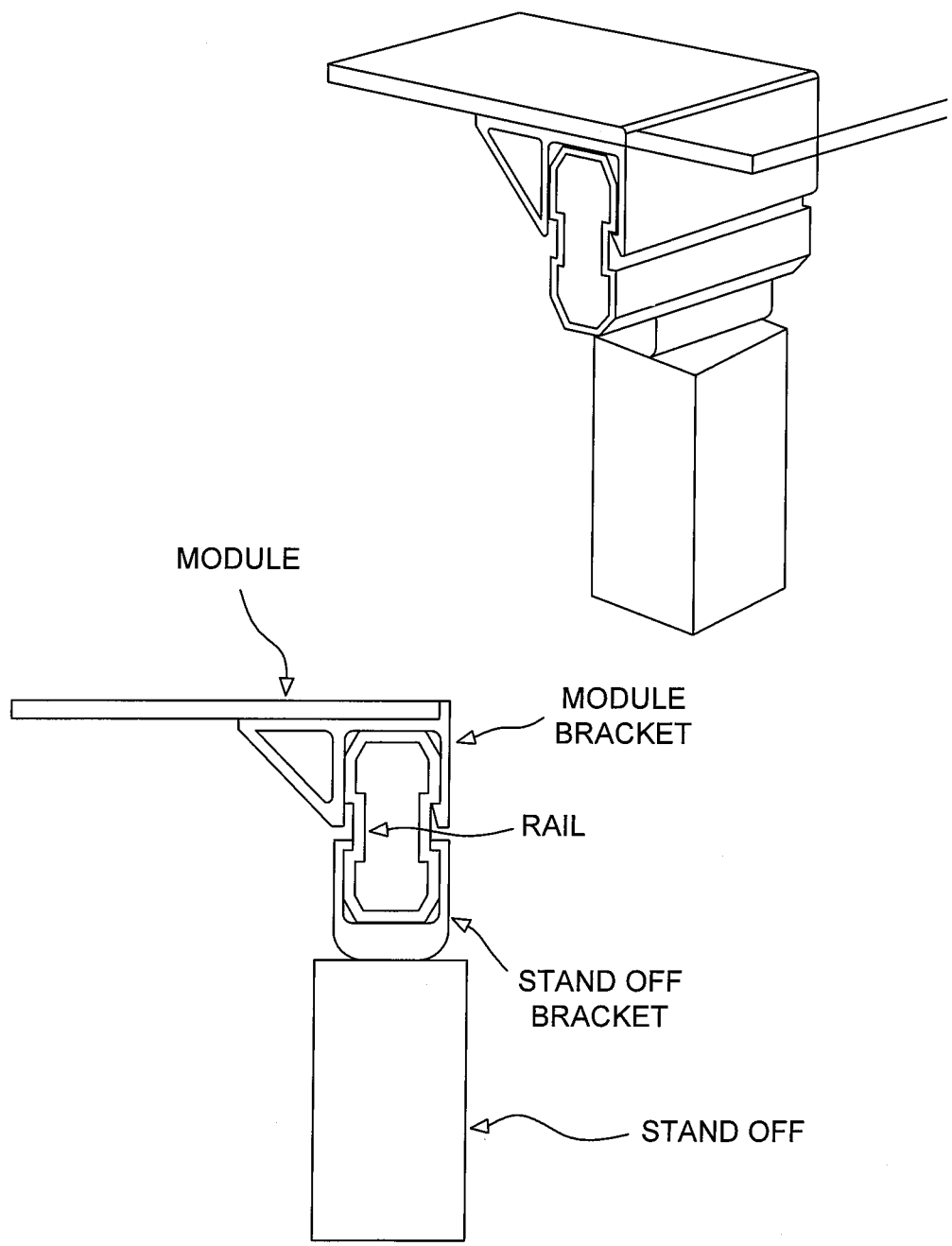
FIG. 27 is an illustration of another embodiment of the mounting system.
Figure 28:
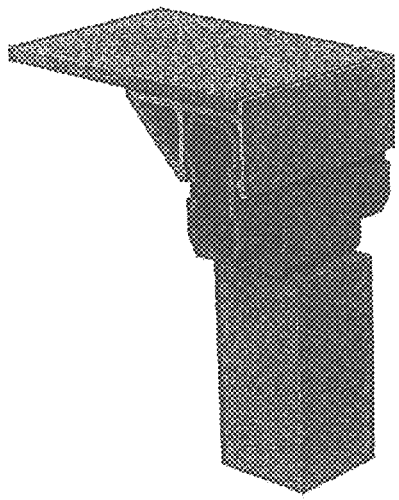
FIG. 28 is an illustration of another embodiment of the mounting system.
Figure 29:
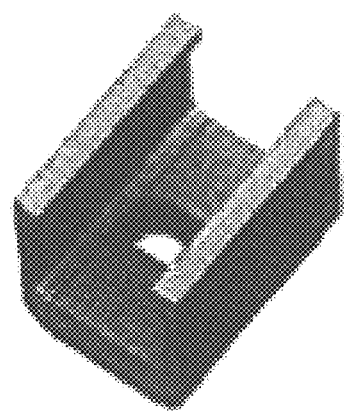
FIG. 29 is a perspective view of a substructure of the mounting system shown in FIG. 28.

Another embodiment of the mount system is illustrated in FIGS. 27 and 28. As shown, the system may include a standoff, a standoff bracket and module bracket around a rail, and a module. The standoff bracket encompasses the bottom half of the rail and separates the rail from the standoff. Similarly, the module bracket encompasses the top half of the rail and separates the rail from the module. The module bracket further includes a triangular segment which extends inward to provide additional support to the module. Preliminary calculations as to the structural characteristics of the mount system are provided in FIG. 29.

Figure 30:
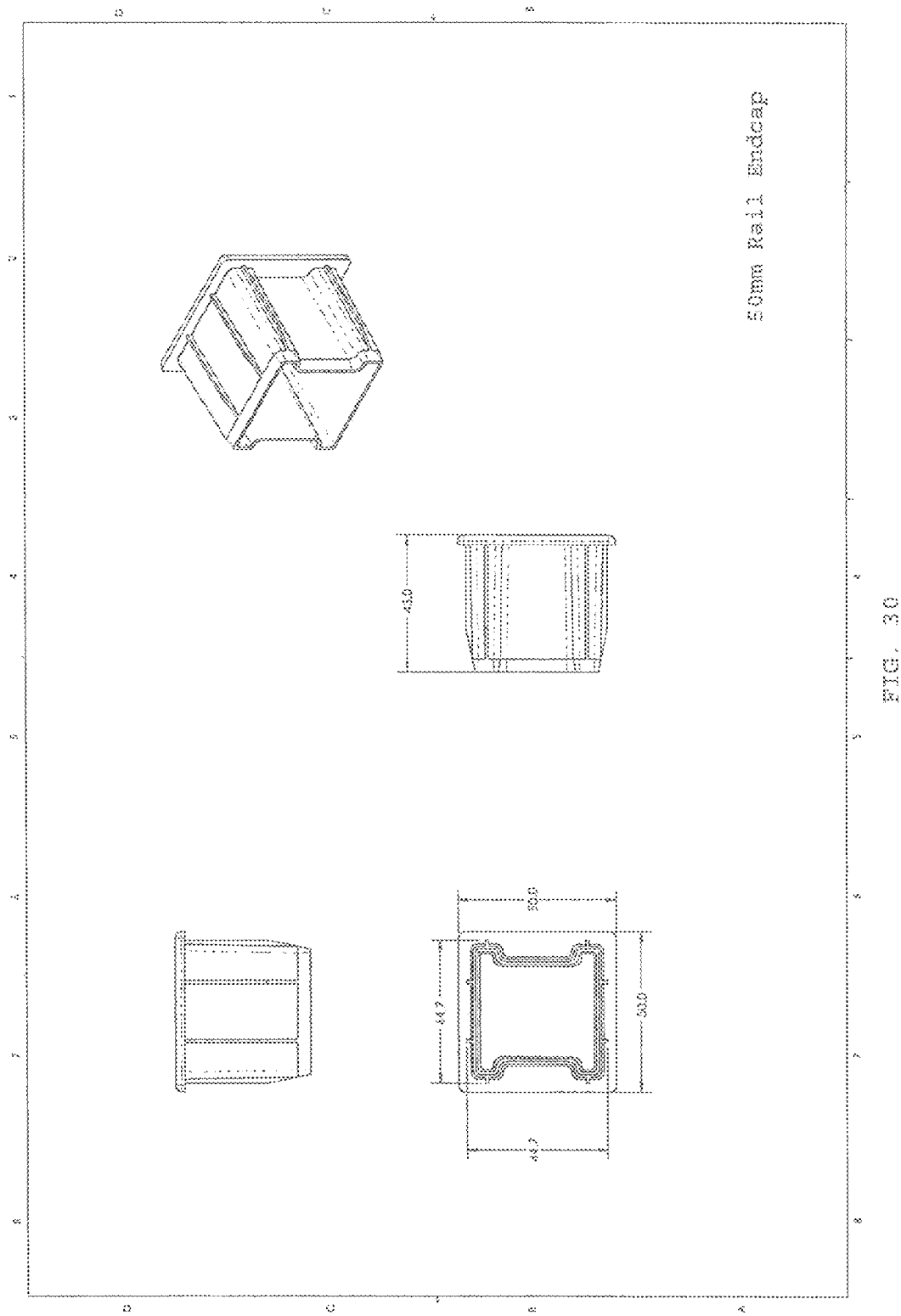
FIG. 30 is an illustration of a 50 mm rail endcap.
Figure 31:
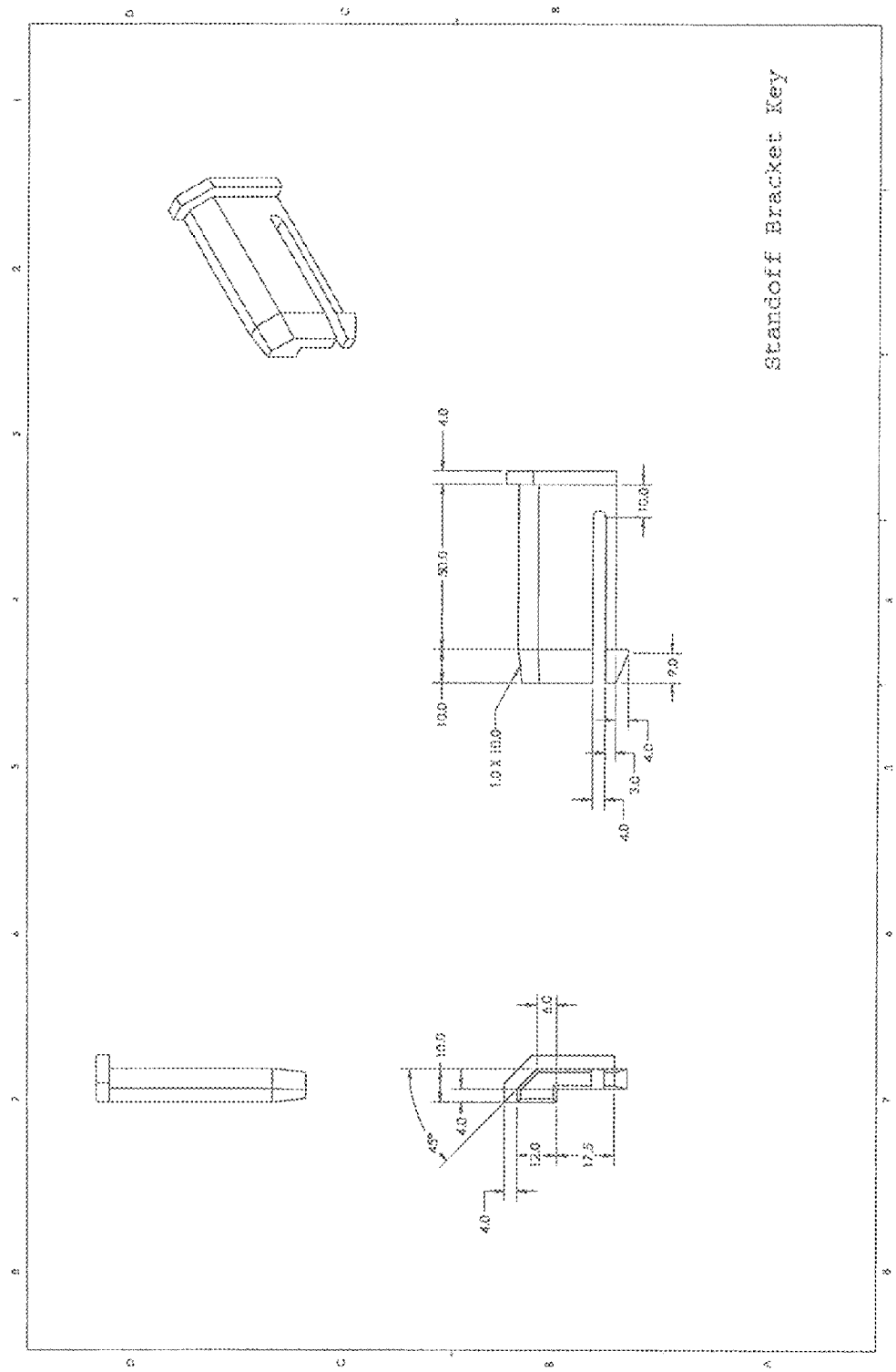
FIG. 31 is an illustration of a standoff bracket key.
Figure 32:
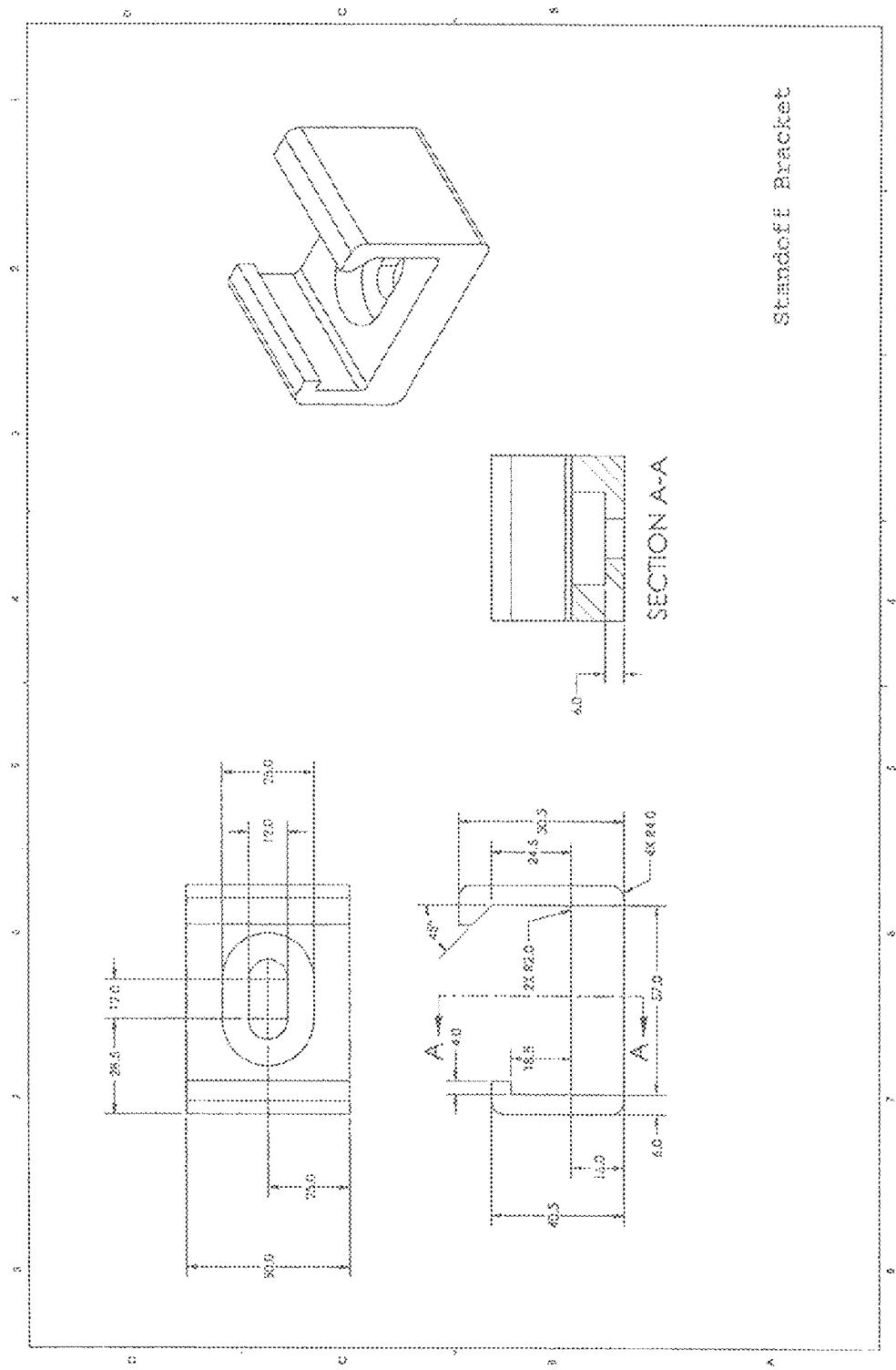
FIG. 32 is an illustration of a standoff bracket.
Figure 33:
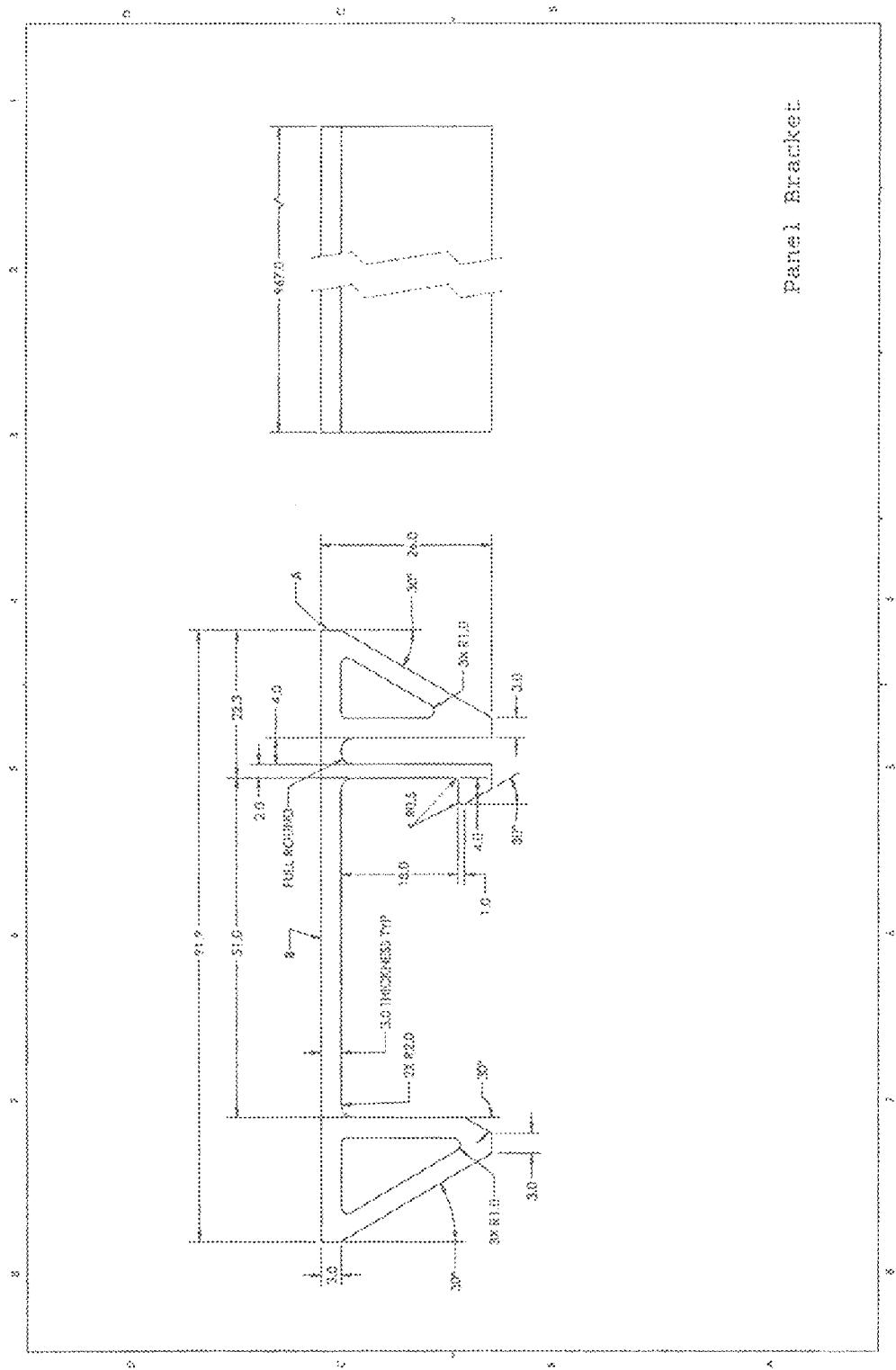
FIG. 33 is an illustration of a panel bracket.
Figure 34:
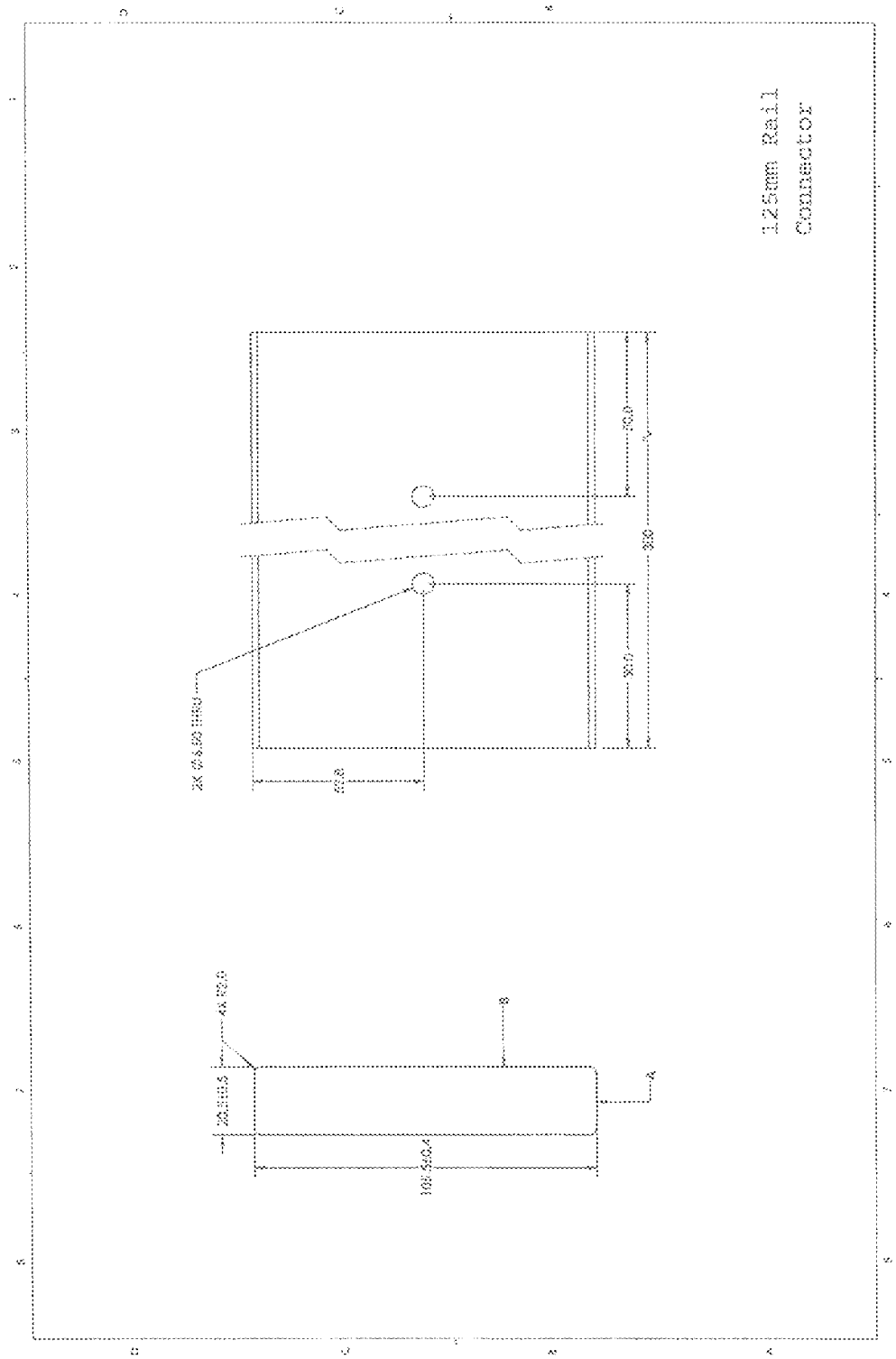
FIG. 34 is an illustration of a 125 mm rail connector.
Figure 35:
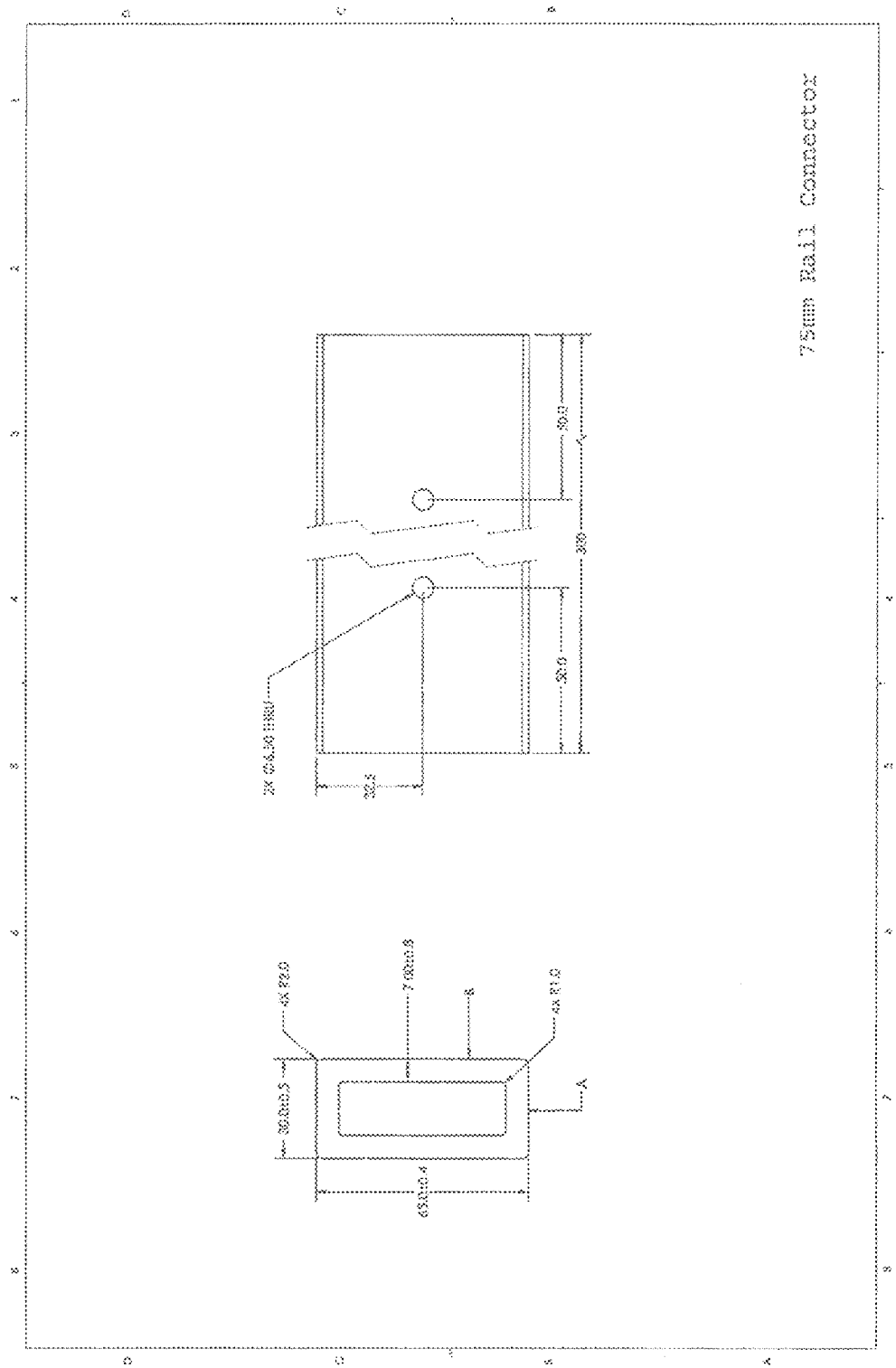
FIG. 35 is an illustration of a 75 mm rail connector.
Figure 36:
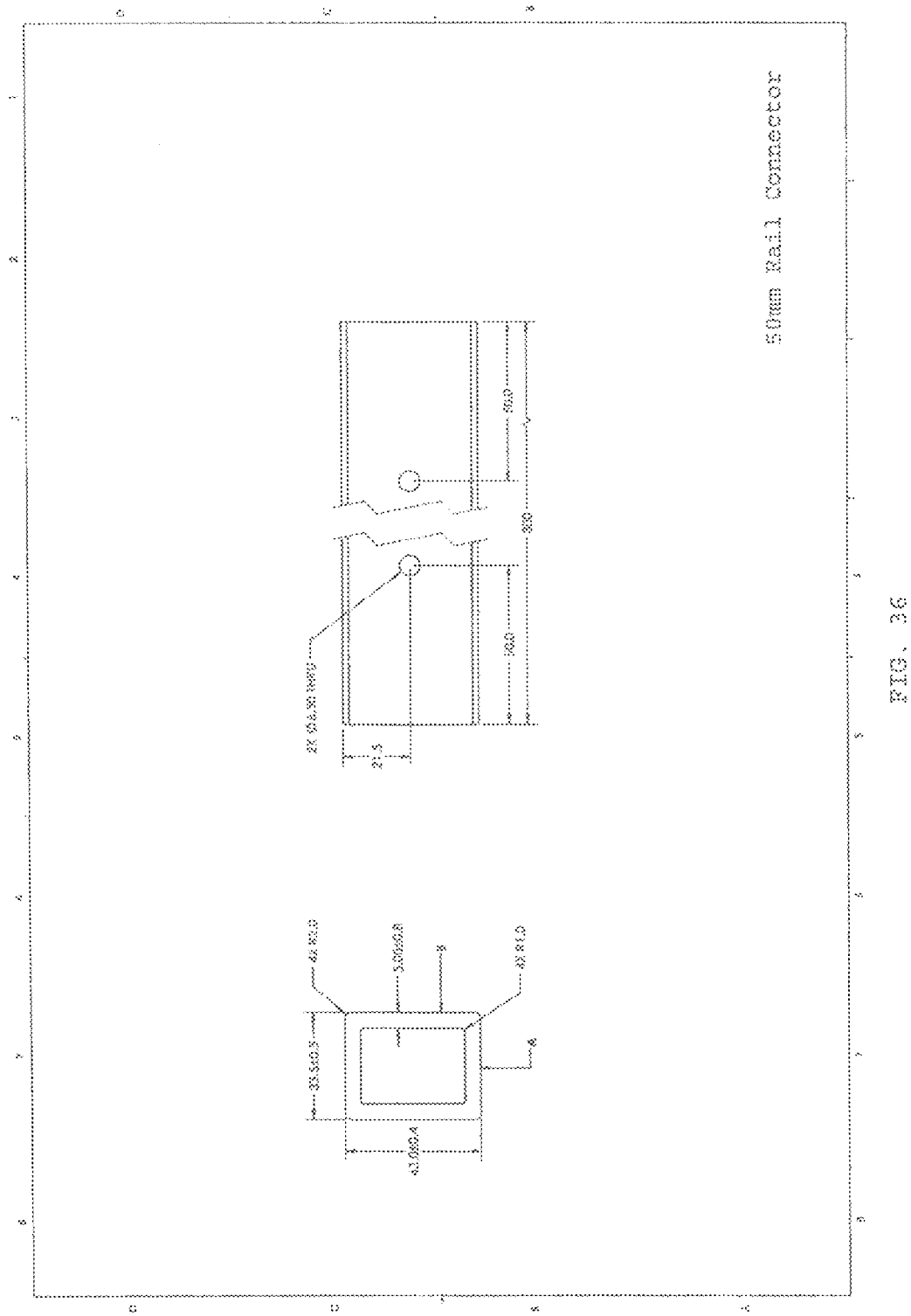
FIG. 36 is an illustration of a 50 mm rail connector.
Figure 37:
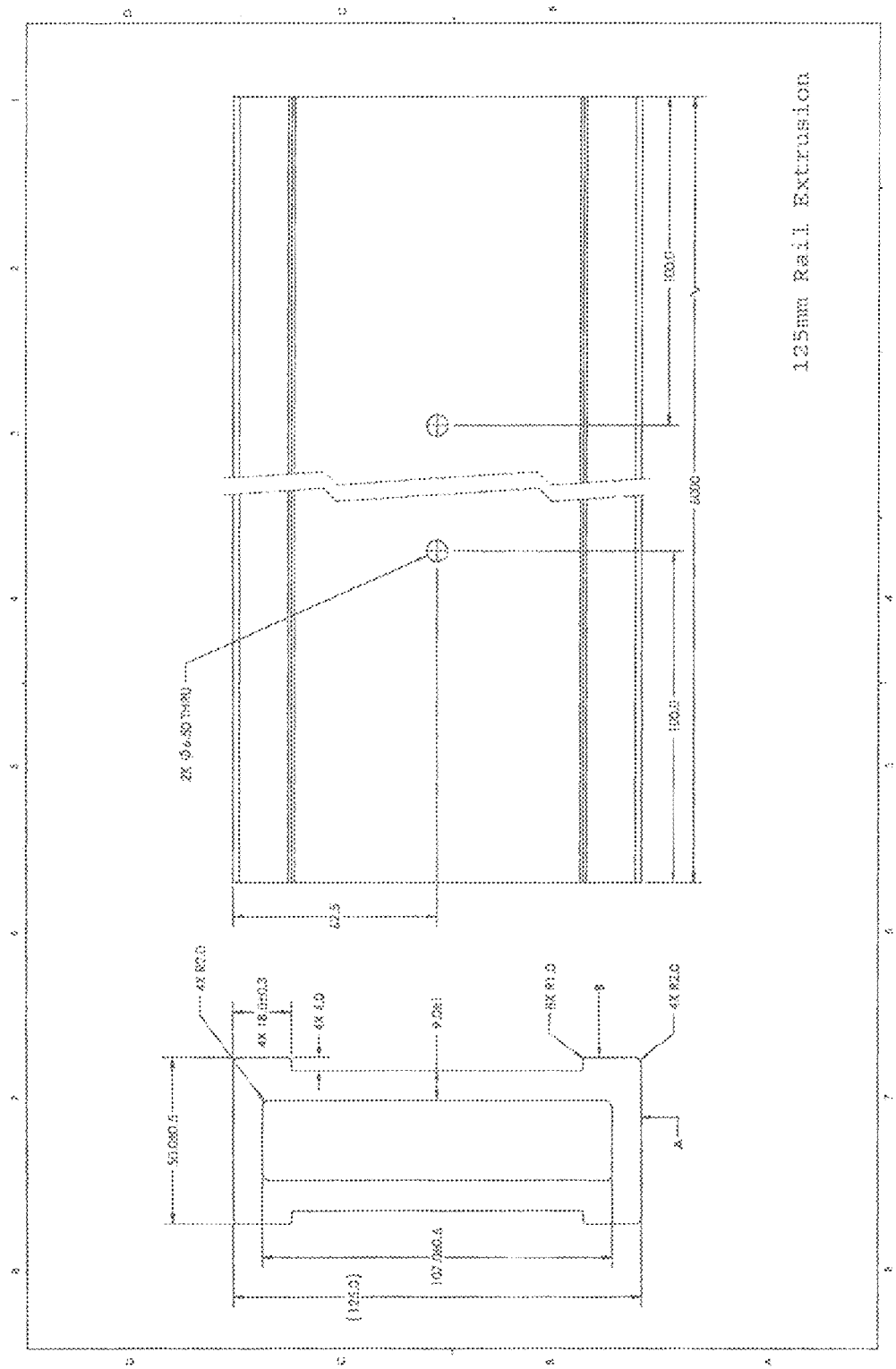
FIG. 37 is an illustration of a 125 mm rail extrusion.
Figure 38:
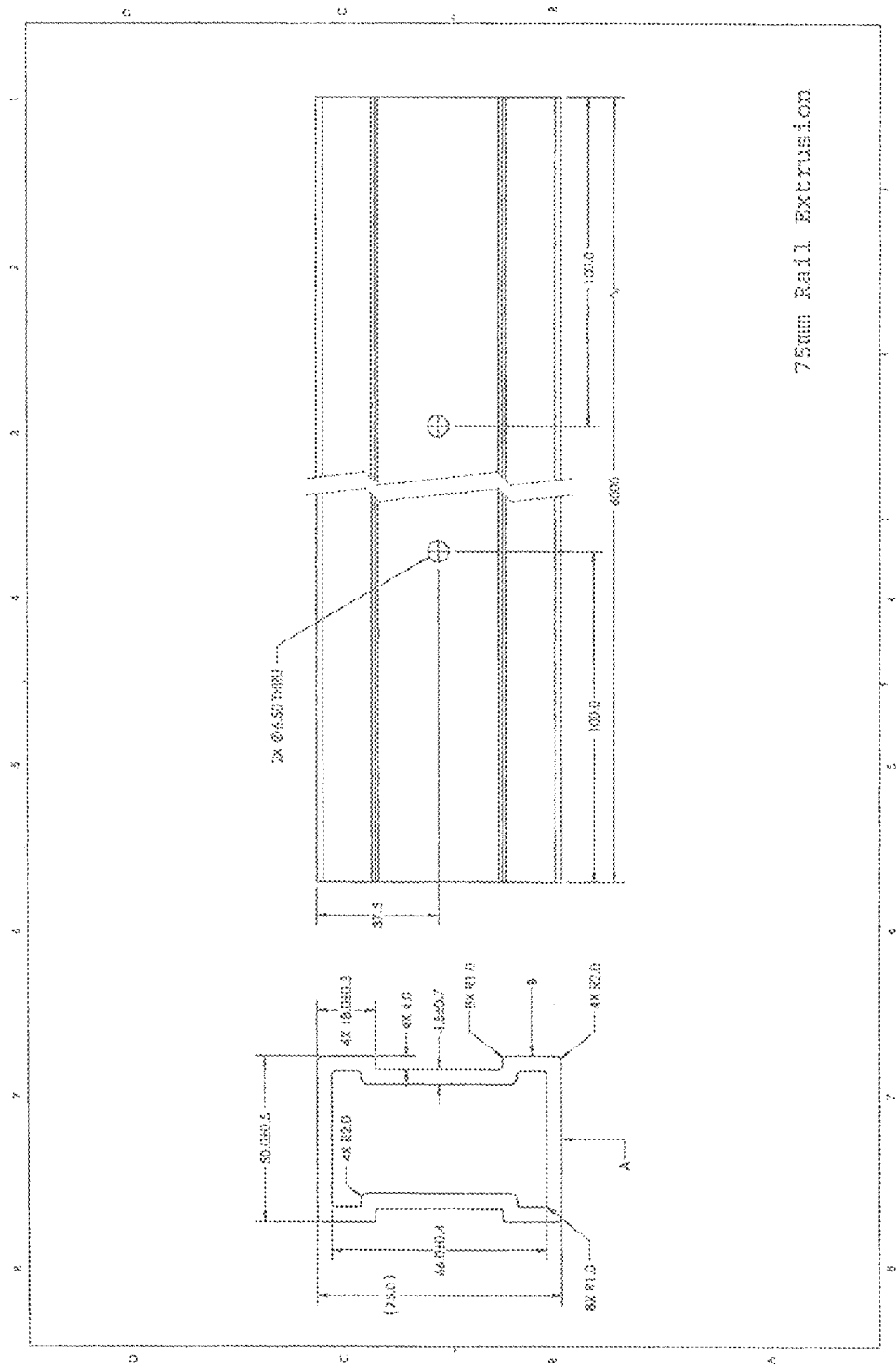
FIG. 38 is an illustration of a 75 mm rail extrusion.
Figure 39:
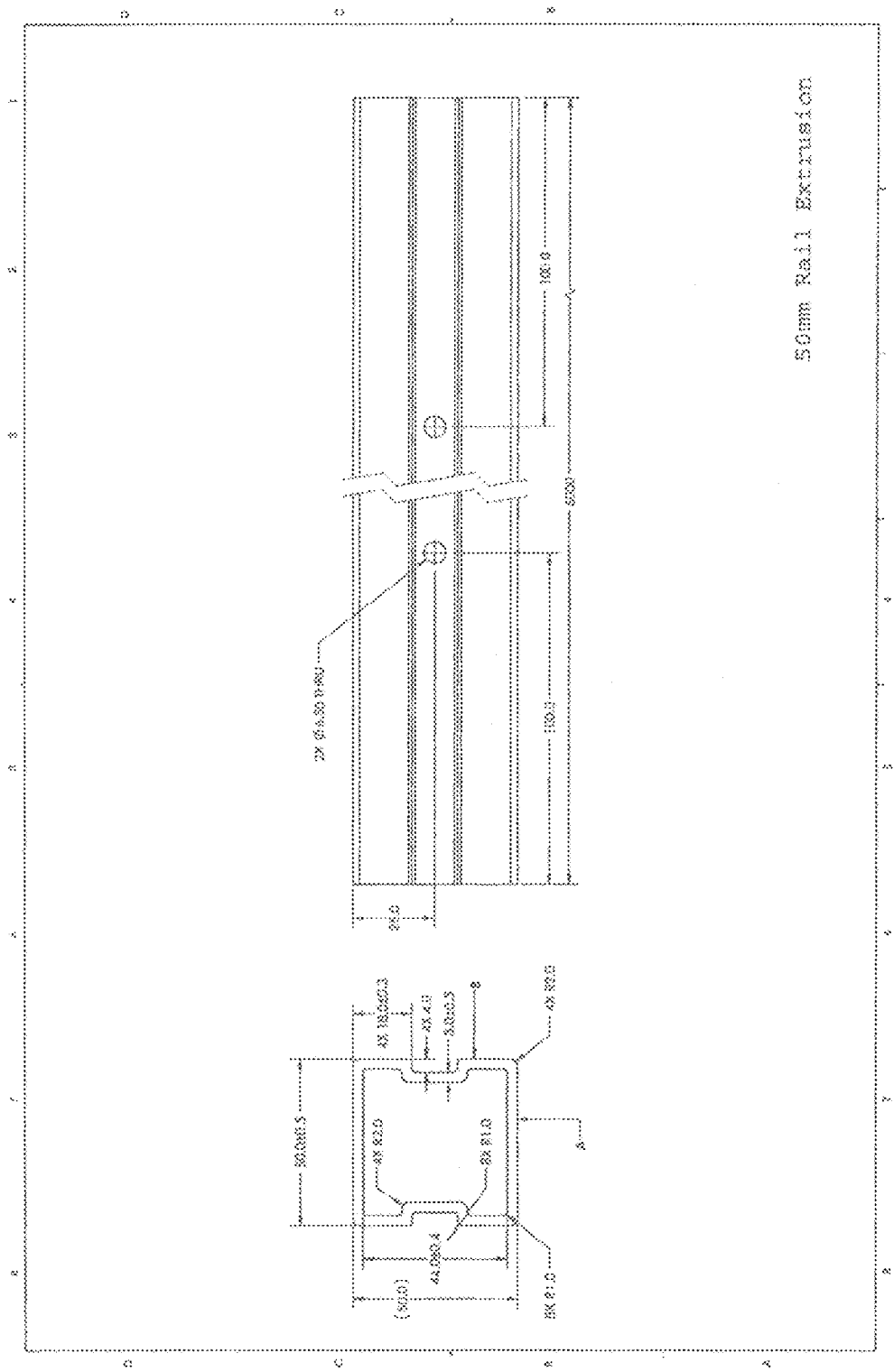
FIG. 39 is an illustration of a 50 mm rail extrusion.
Figure 40:
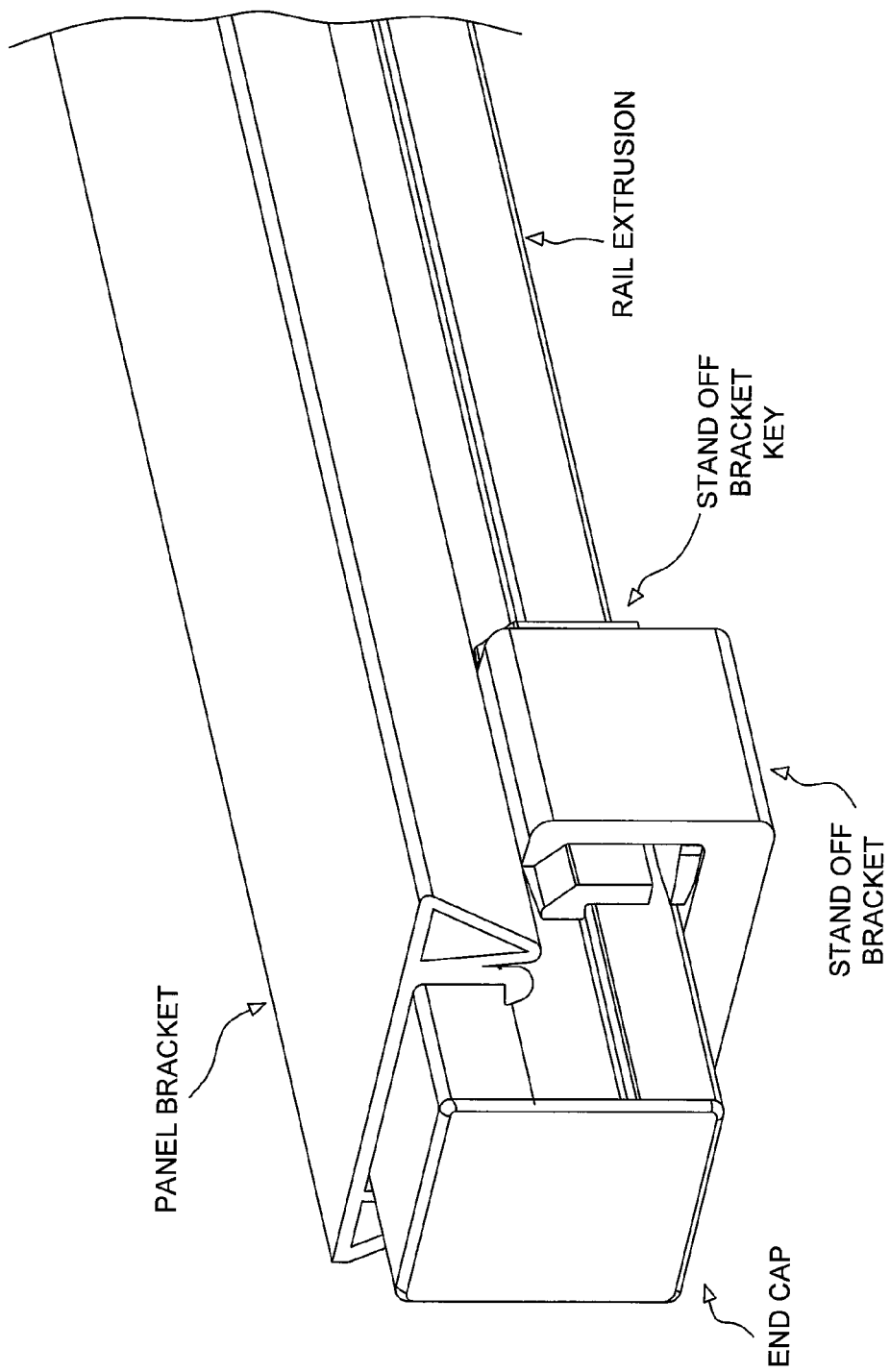
FIG. 40 is an illustration of another embodiment of the mounting system.
Figure 41:
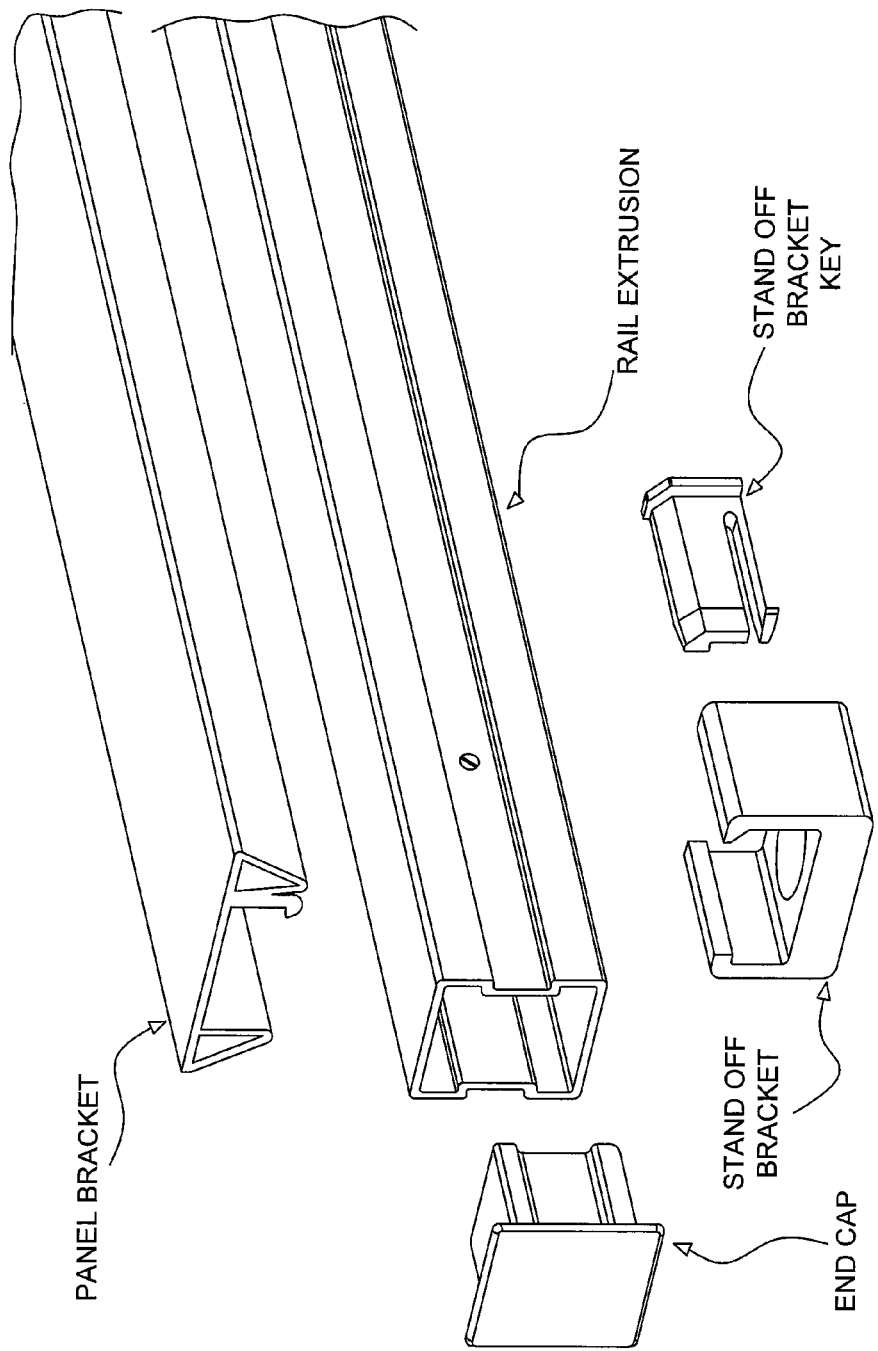
FIG. 41 is an illustration of another embodiment of the mounting system.
Figure 42:
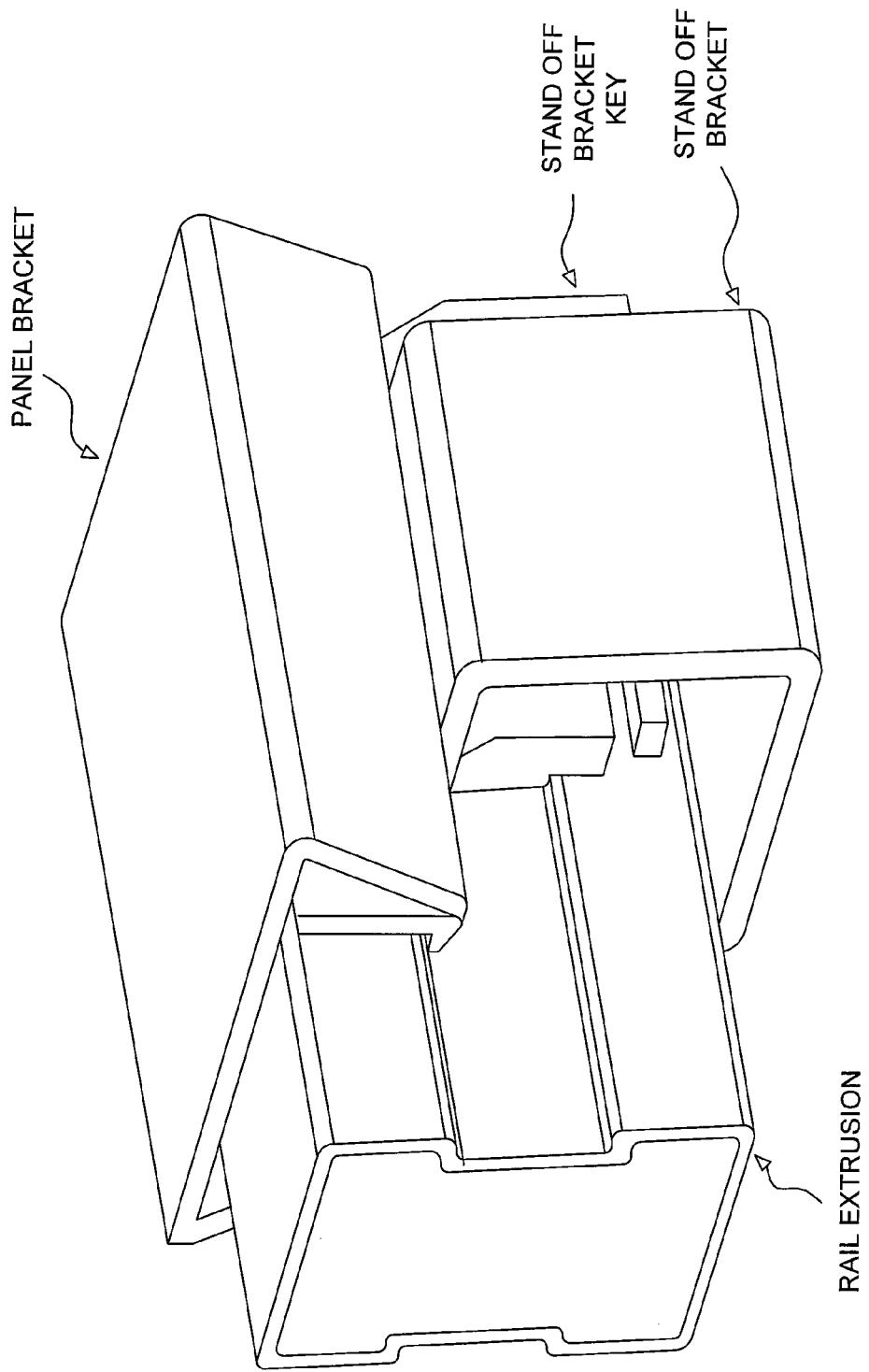
FIG. 42 is an illustration of another embodiment of the mounting system.

Another embodiment of the mount system is illustrated in FIGS. 40 through 42. The various components which can be assembled into the mount system are shown in FIGS. 30 through 39. The mount system of this embodiment is assembled with snap-together parts, as shown in the figures. In one embodiment, the rail extrusion, illustrated in several heights in FIG. 37 through 39, 39, 125 mm, is removably connected to a stand-off bracket, FIG. 32, and a panel bracket, FIG. 33, by use of a stand-off bracket key, FIG. 31, which is removably snapped into place, as illustrated in FIGS. 40 through 42. Rail end caps are provided for the various sizes of the rail extrusions, as illustrated in FIG. 30, and in the assembled system in FIGS. 40 through 42.

Figure 44:
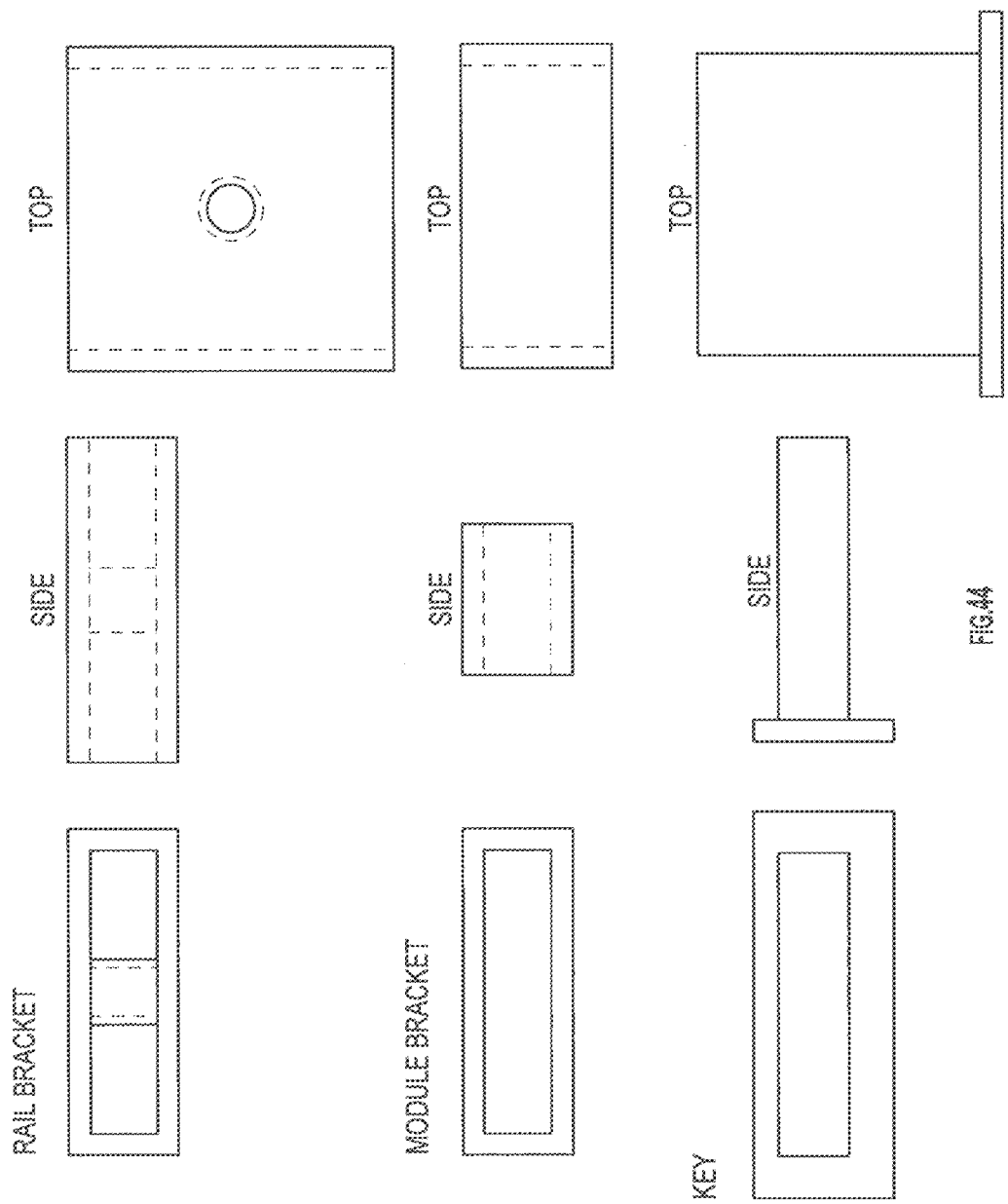
FIG. 44 is an illustration of a rail bracket, a module bracket, and a key.

Another embodiment of the mount system is illustrated in FIG. 44. In one embodiment, the mount system includes a module bracket, which is removably connected to the module. Further, the module bracket is connected to the rail bracket by use of a key. The connection may be snapped together, or the key may slide into the attachment, or it may be a combination of snapping and sliding. Furthermore, electrical connection between the modules, or between the modules and a junction box, may be made with wire connectors. Furthermore, wire harnesses may be used to connect the wires to the modules, or the rails, or the brackets, or the clips, or each may be connected in any arrangement.

Figure 45:
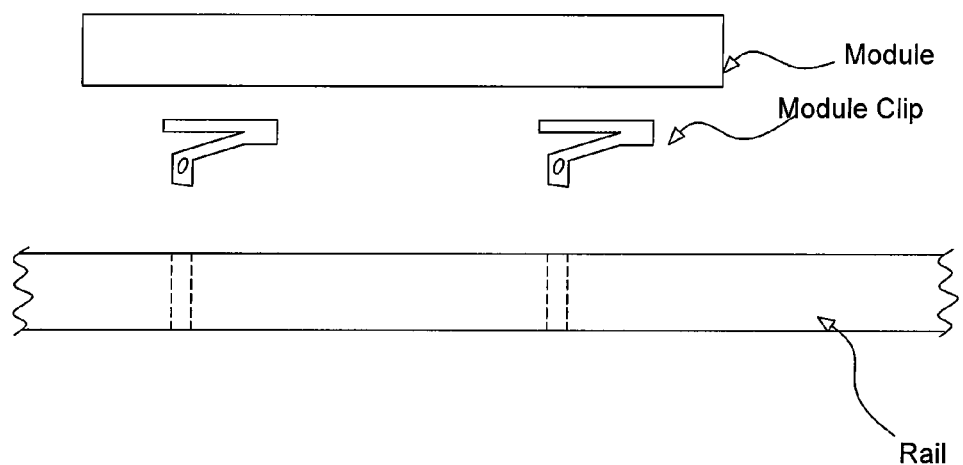
FIG. 45 is an illustration of a module clip and a rail.

Another embodiment of the mount system is illustrated in FIG. 45. In one embodiment, the mount system includes a module clip, which is removably connected to the module. Further, the module clip is connected to the rail. The connection between the module clip and the rail may be accomplished by snapping them together, or by sliding the clip into the rail, or may be held by a key that may slide into the attachment, or it may be a combination of snapping and sliding. Furthermore, electrical connection between the modules, or between the modules and a junction box may be made by with wire connectors. Furthermore, wire harnesses may be used to connect the wires to the modules, or the rails, or the clips, or brackets, or each may be connected in any arrangement.

Figure 46:
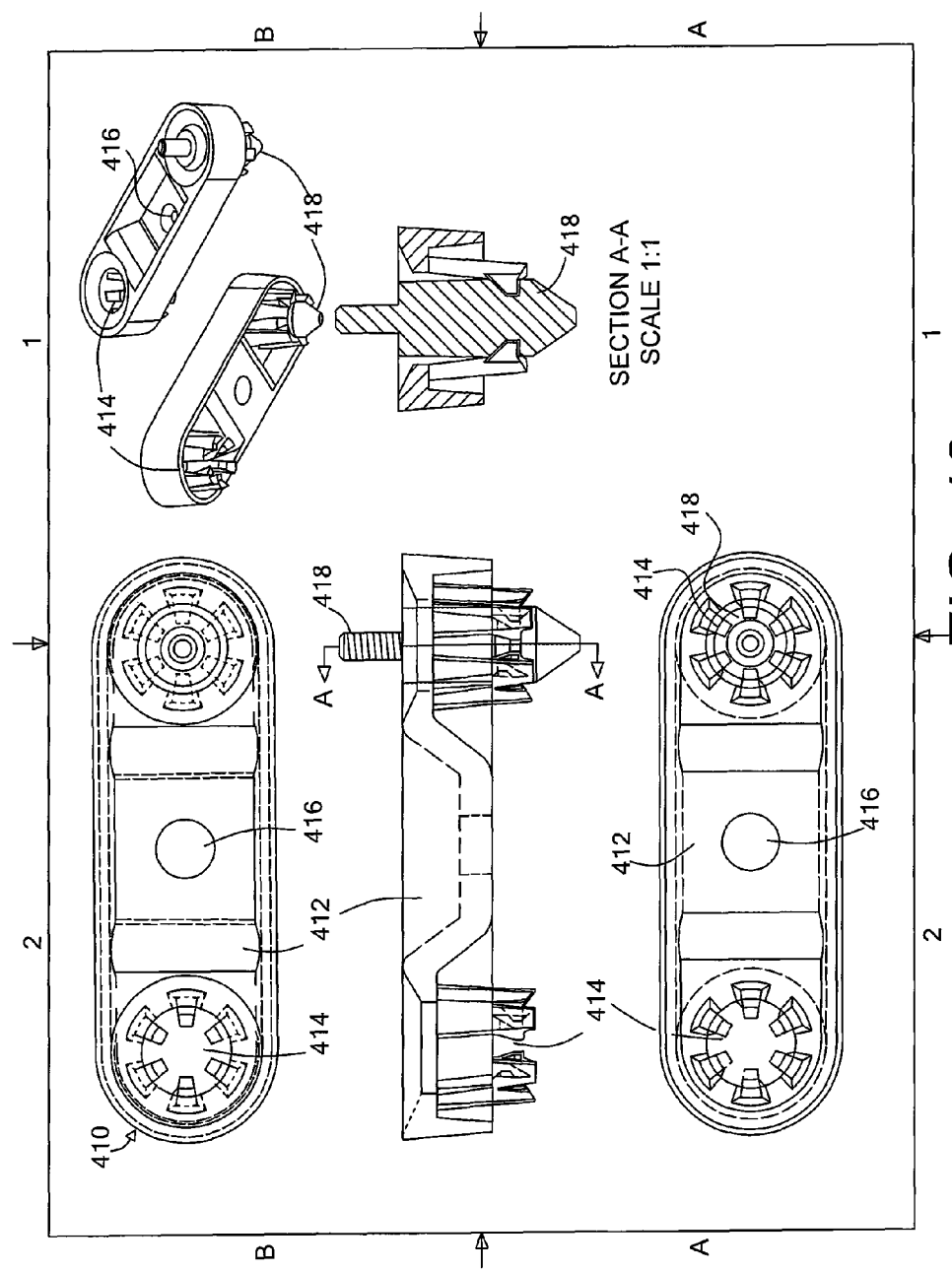
FIG. 46 depicts several views of the mounting system, according to another embodiment of the invention (this figure is to scale)
Figure 47:
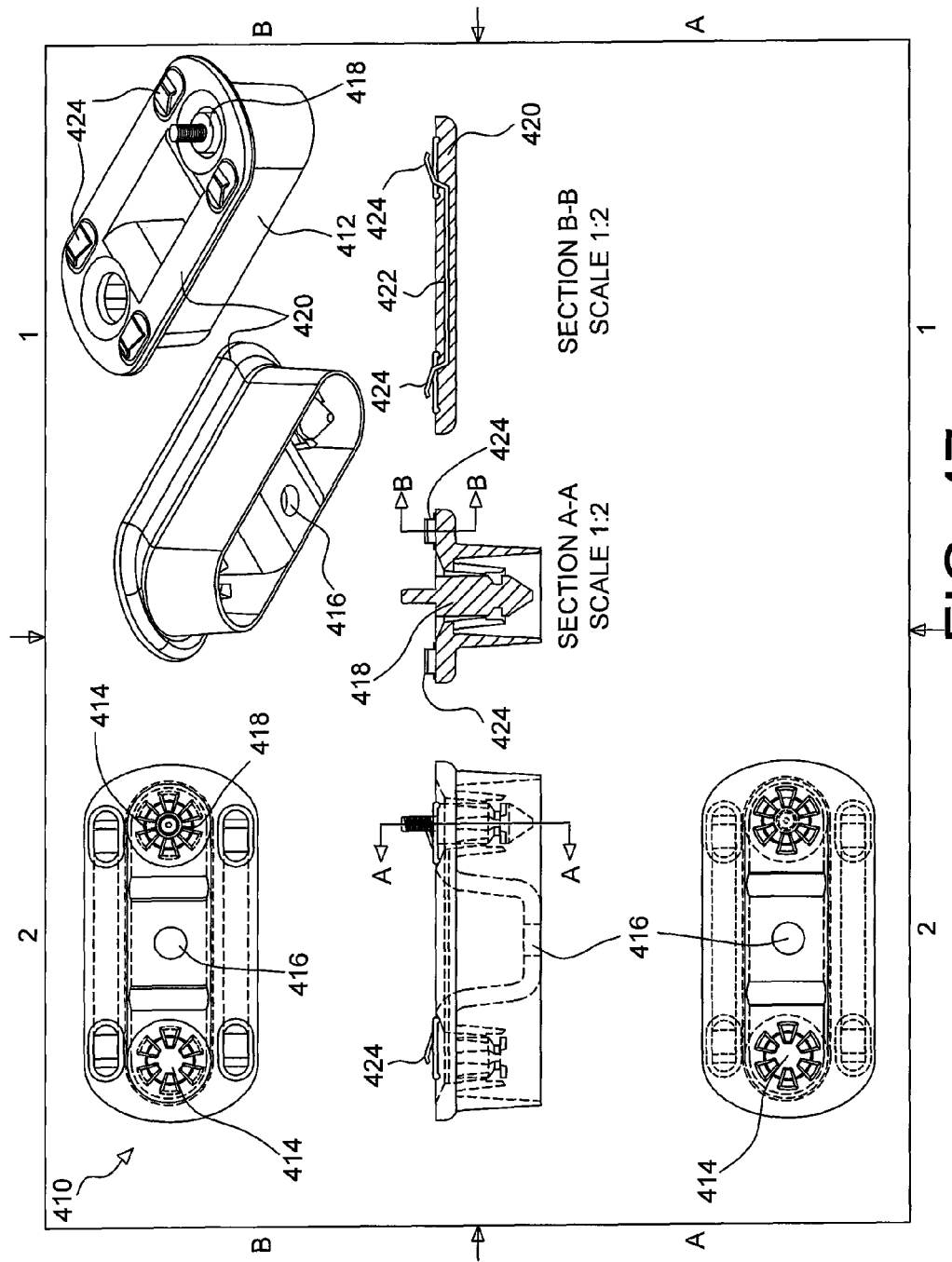
FIG. 47 depicts several views of the mounting system, according to another embodiment of the invention (this figure is to scale)
Figure 48:
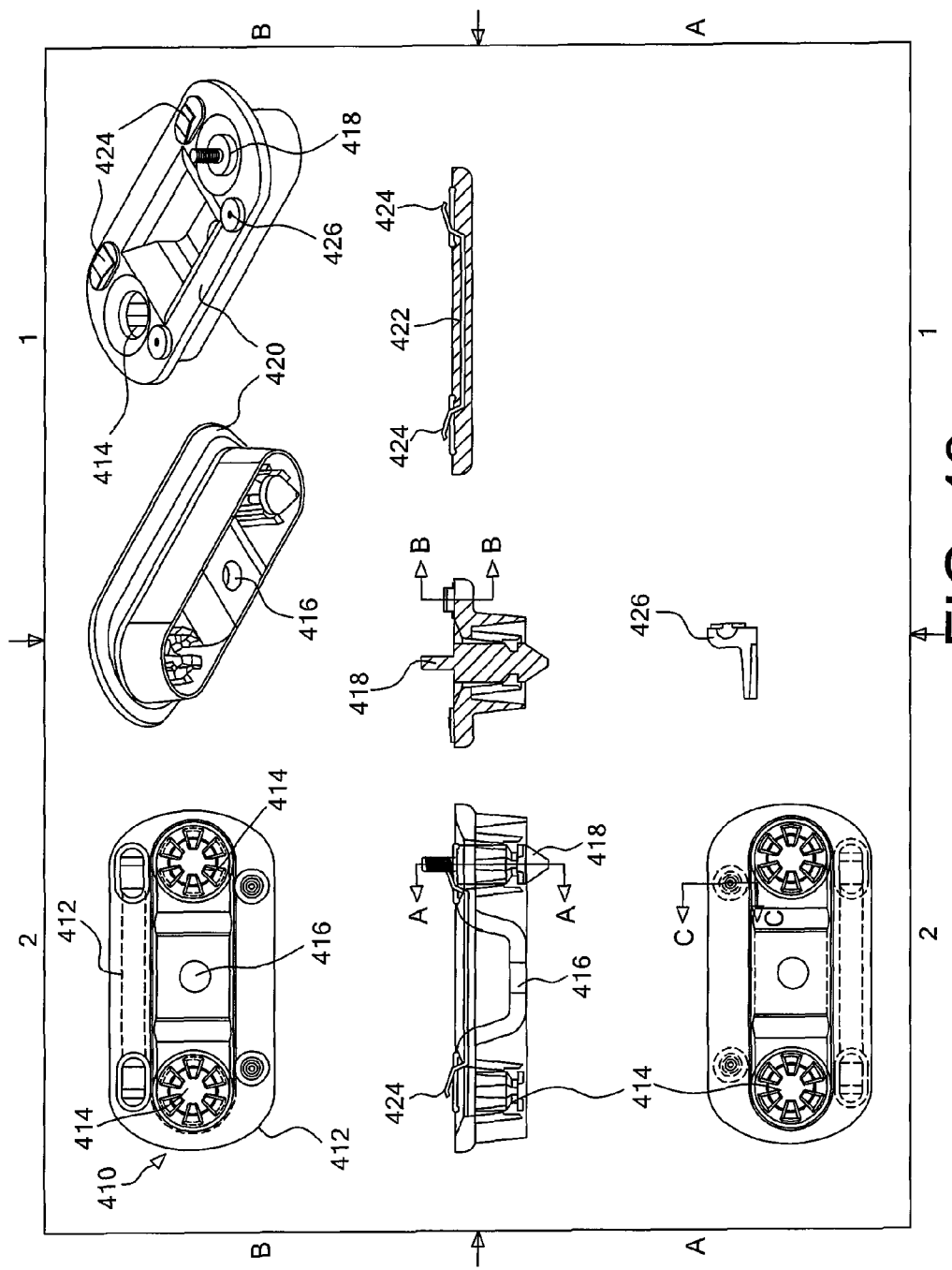
FIG. 48 depicts several views of the mounting system, according to another embodiment of the invention (this figure is to scale)

FIGS. 46-48 depict several views of the mounting system with components as identified in the below component list ("List").

Benefits of the system include rapid installation. In one preferred embodiment, a standard-sized PV array, using a plurality of devices 10, may be installed in below one (1) minute; in a more preferred embodiment, in less than thirty (30) seconds, and in a most preferred embodiment, in less than twenty (20) seconds. Furthermore, the device 10 is configured such that when attached or engaged with a PV array, the PV array may be readily handled and/or moved so as to ease installation and/or decrease time of installation. Note that easier and/or quicker installation yields reduced costs, comprising labor costs and construction costs.

Generally, in one embodiment, device 10 comprises body 12 which comprises two fingered apertures 14 and one aperture 16. Each of fingered apertures 14 are configured to receive pin 18. Pin 18 comprises an upper threaded portion and a lower angled or bullet portion. The pin 18 press-fits or interference fits with fingers of fingered aperture 14 so as to initially spread the fingers before reaching a set position, which may be a locked position. Device 10 may comprise a shelf 20 which comprises connector 22 and mount 26. Connector 22 comprises ends 24. Connector may be an electrical connector and may comprise a metal alloy so as to provide electrical communication.

Figure 49:
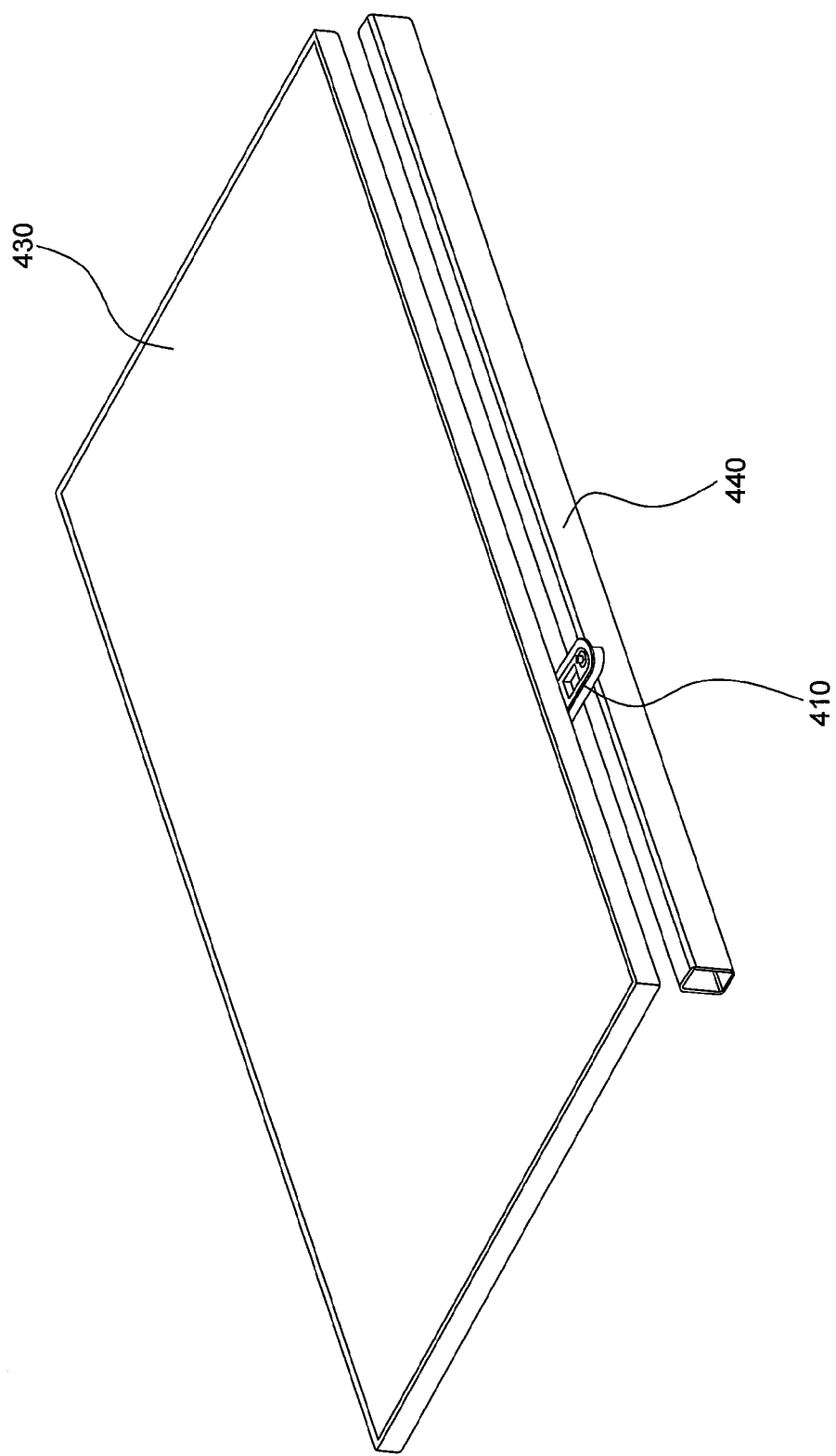
FIG. 49 depicts an upper perspective view of the mounting system as engaged with a PV array, according to an embodiment of the system.
Figure 50:
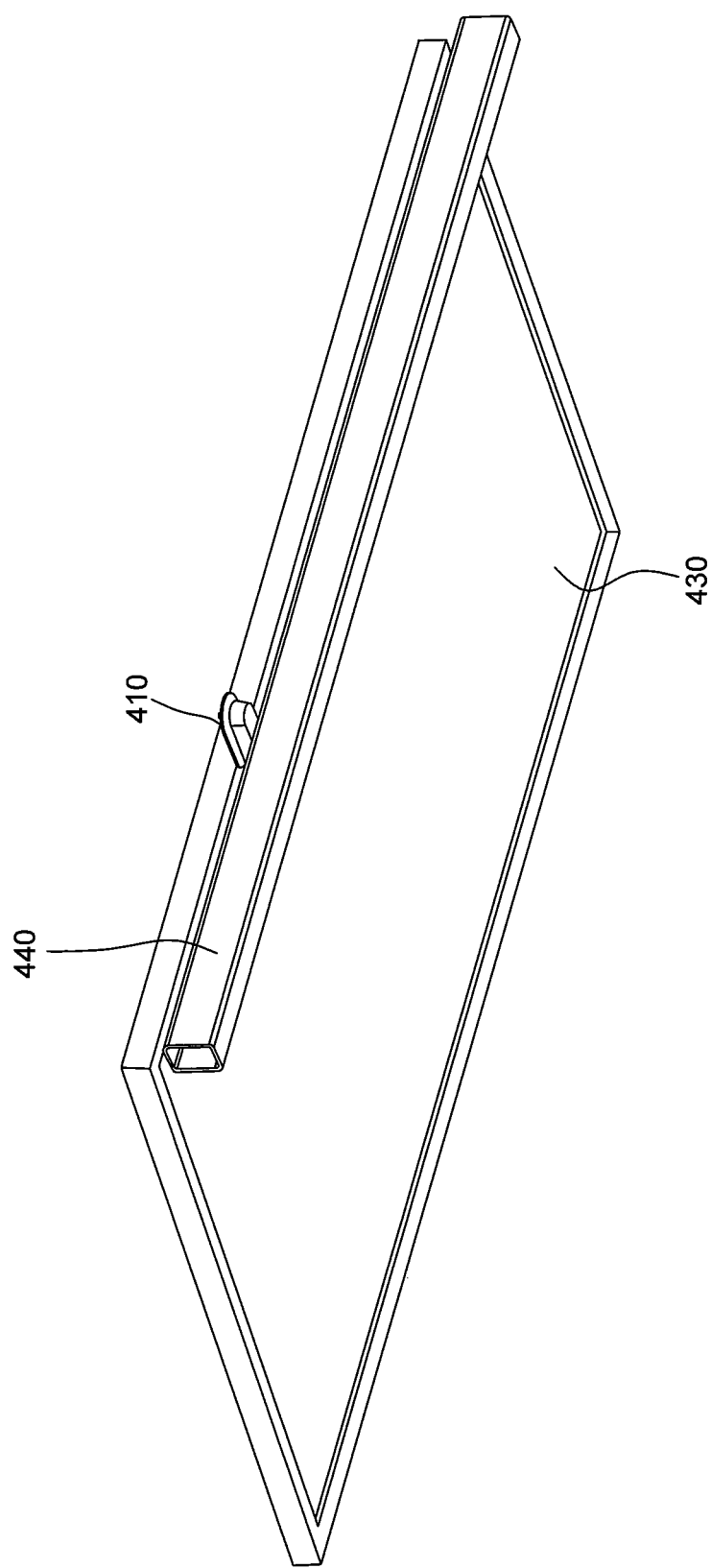
FIG. 50 depicts a bottom or lower perspective view of the mounting system of FIG. 49.
Figure 51:
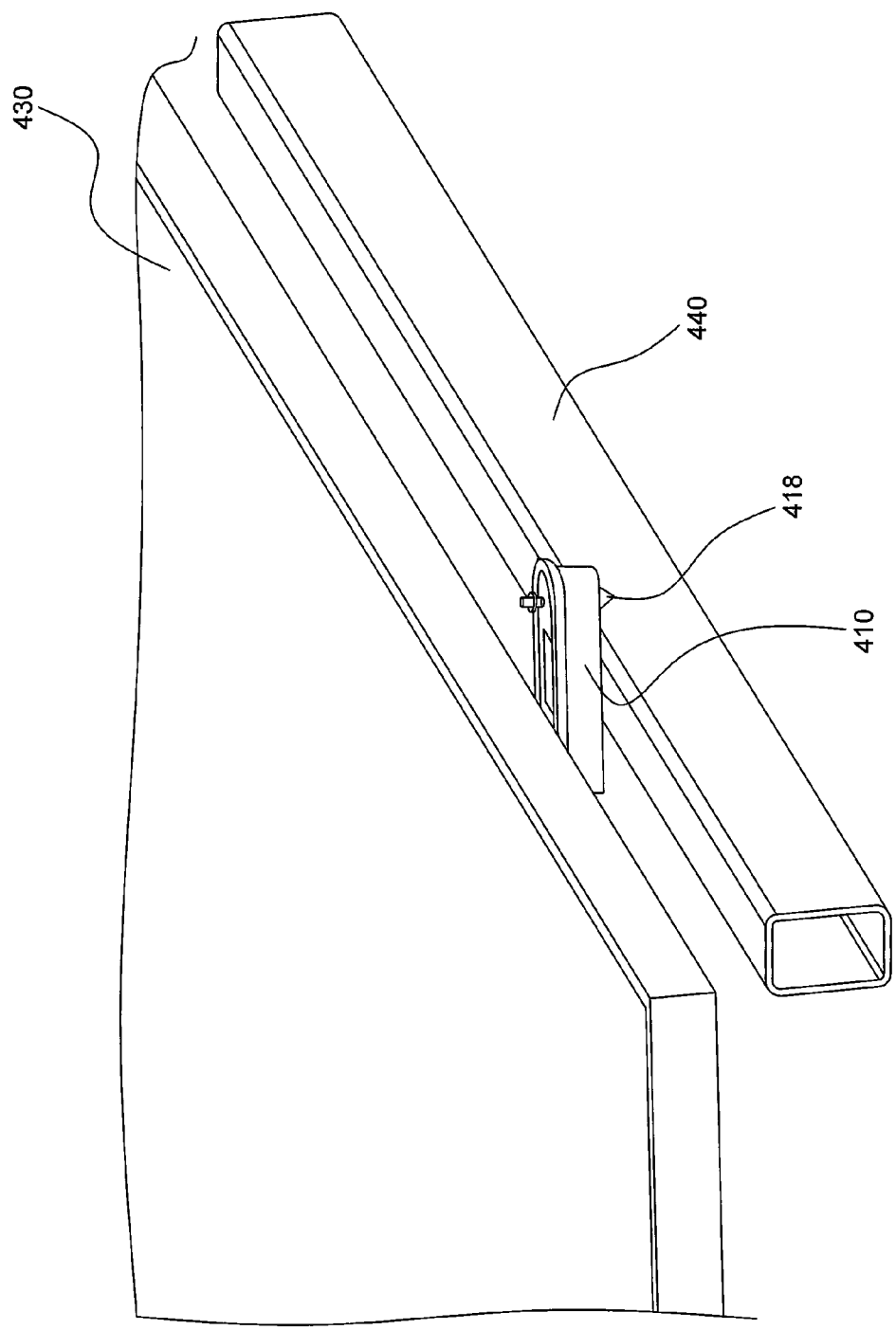
FIG. 51 depicts a close-up upper perspective view of the mounting system of FIG. 49.
Figure 55B:
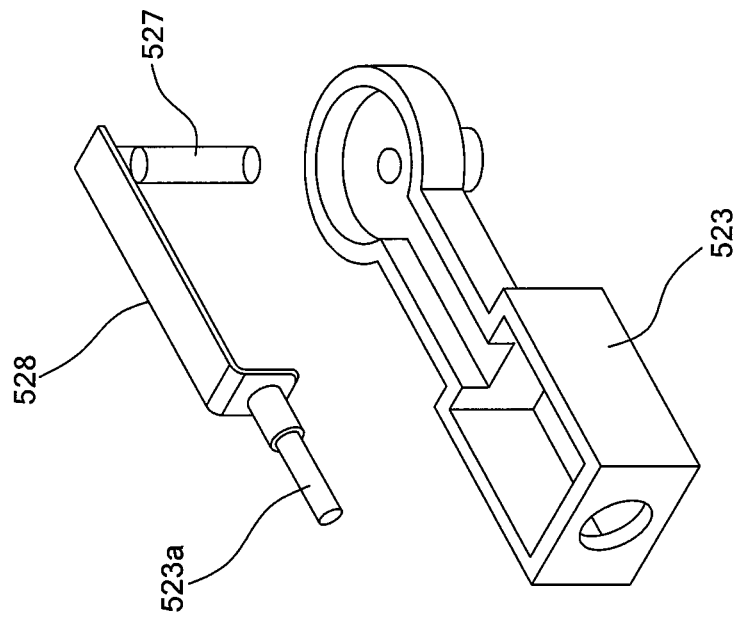
FIGS. 55A-55B show perspective views of male and female MC4 connectors according to one embodiment of the present invention (this figure is to scale)
Figure 55A:
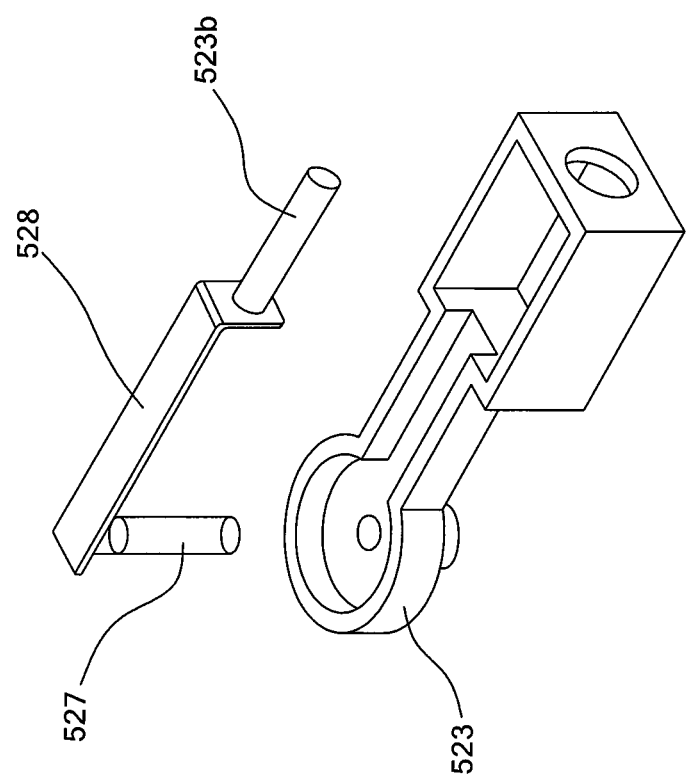

FIGS. 49-51 depict an embodiment of the device 10 as engaged with a PV array 30 and a rail 40. Rail 40 may be as described in one or more of the documents cross-referenced above.

FIGS. 52-60 depict several embodiments of the invention. The present invention provides a unique and novel, integrated electrical and mechanical PV array interconnection system 500, which will allow for the efficient installation of PV arrays 510. Furthermore, the present invention provides a novel and unique electrical connection system which includes interchangeable connectors, allowing a variety of electrical systems to be attached to the PV array 510.

FIGS. 52a-52b show a top and bottom view of one embodiment of the PV array interconnection system 500 in use with a PV array 510. As shown, the PV array interconnection system 500 includes a module 520 and purlin connector 530 which attach to a purlin 540. The modules 520, which connect to the top surface of the purlin 540, further attach to a PV array 510. In one embodiment, modules 520 are attached to the top surface of the purlin 540 to interconnect with the PV array 510.

FIG. 52c shows the connection of the module 520, purlin connector 530, and purlin 540 in greater detail. As shown, the module 520 extends downward, through the purlin 540, where it further connects with the purlin connector 530. The module 520 snaps into the purlin connector 530, which keeps the module 520 in place on the purlin 540. Once the required number of modules 520 is installed, the PV array 510 is attached to the modules 520. This system 500 creates a bearing load that is broader than what is typically used, which allows the purlins 540 to have thinner wall thicknesses and lower tensile strengths, which leads to a reduction of costs.

FIGS. 53a-53c show a bottom view of one embodiment of the present invention, showing the connection between the modules 520 and PV array 510 without the purlin 540. As shown, the bottom of the module 520 may have a plurality of protrusions 521. These protrusions 521 extend down through the purlin 540, where they snap into place with the purlin connector 530. In one embodiment, the module 520 comprises two groups of protrusions 521, arranged in a circular fashion. However, one having skill in the art will recognize that any number of arrangements may be utilized, including rectangular, triangular, etc. Each group of protrusions 521 includes at least two protrusions 521. However, one having skill in the art will recognize that the groups of protrusions 521 can include two, three, four, five, six, seven, or eight or more protrusions 521, with each group preferably having four protrusions 521. Moreover, the module 520 further includes a downwardly extending electrical connector 522.

Furthermore, the module 520 may further comprise a male or female MC4 connector 523a, 523b. As shown, these connectors 523a,523b allow for an electrical connection between the modules 520 and a junction box 524. To make the connection between the modules 520 and the junction box 524, one module 520 utilizes a male MC4 connector 523a, while the other utilizes a female MC4 connector 523b. An electrical cable 525, having a male and female end, is then utilized to connect the modules 520 together with the junction box 524. The female end of the electrical cable 525 is inserted into the male MC4 connector 523a. The cable then connects with the junction box 524, before continuing on to the second module 520, where the male end of the electrical cable 525 is then inserted into the female MC4 connector 523b. These connections allow the modules 520 to be adaptive to a plurality of wiring requirements, including the 1000V standard and the 1500V standard. Thus, utilizing the MC4 connectors 523a, 523b as well the downwardly extending electrical connectors 522, it is possible to allow electrical communication between the module 520, the junction box 524, and additional modules 520.

Additionally, the connection from below that may be integrated into the purlin connector 530 shows a rubber washer/gasket 531 to create a dry connection. It is further envisioned that the electrical connector 522 from above—the module connection—and the electrical connector 532 from below—the purlin connection—would be self sealing and would not require a rubber washer/gasket 531 and would allow for the receiving cylinder on the purlin connector 530 to have an opening on the bottom to allow for moisture to escape prior to and following the completed assembly of all connections.

With reference to FIGS. 54a-54b, 55a-55b, and 59 the surface of the module 520 may include a recessed area 526 for receiving the module connectors 523. The electrical connectors 528 may press and snap into position prior to adhering the module connector 523 to the module 520. The connectors 528 may further include a downward facing connection 527 that projects down through the center port where it will connect with the purlin connector 530 upon assembly of the module 520 with the purlin connector 530. Further, each electrical connector 528 will have either a male or female MC4 type connector 523*a*, 523*b* projecting from the inward facing wall of the module connector 523 so that the corresponding "tail" from the module's junction box 524 can be connected to it. In another embodiment, the sidewall of the module connector 523 may have the capability of snapably receiving an electrical system element or box, such as a DC or AC micro inverter device and/or a system performance monitoring device. These elements will make an MC4 type connection to the module connector's 523 electrical connector 528, and such device may have a corresponding MC4 type connector on an opposing wall that may serve to complete the connection between the module connector 523 and the corresponding "tail" from the module's junction box 524. In another embodiment, the electrical connector inserts 528 may include a wider area projecting out of the module connector's sidewall in order to provide for insertion of 2 or more electrical system elements.

Also shown in FIGS. 54*a* and 54*b*, the female-female connector 523*b* and the female-male connector 523*a* may also be slid into position through an opening in the sidewall of the module connector 523, or snapped into position from the underside of the module connector 523, not solely assembled from above as shown which may require assembly before adhering the module connector 523 to the module 520. Further, the drawings show a connector 523 which may be eliminated if the female-female connector 523*b* and the female-male 523*a* connector are attached directly to the wires exiting the module junction box 524, and then assembled into the module connector 523 either prior to or following adhering the module connector 523 to the module 520.

Figures 56A, 56B:
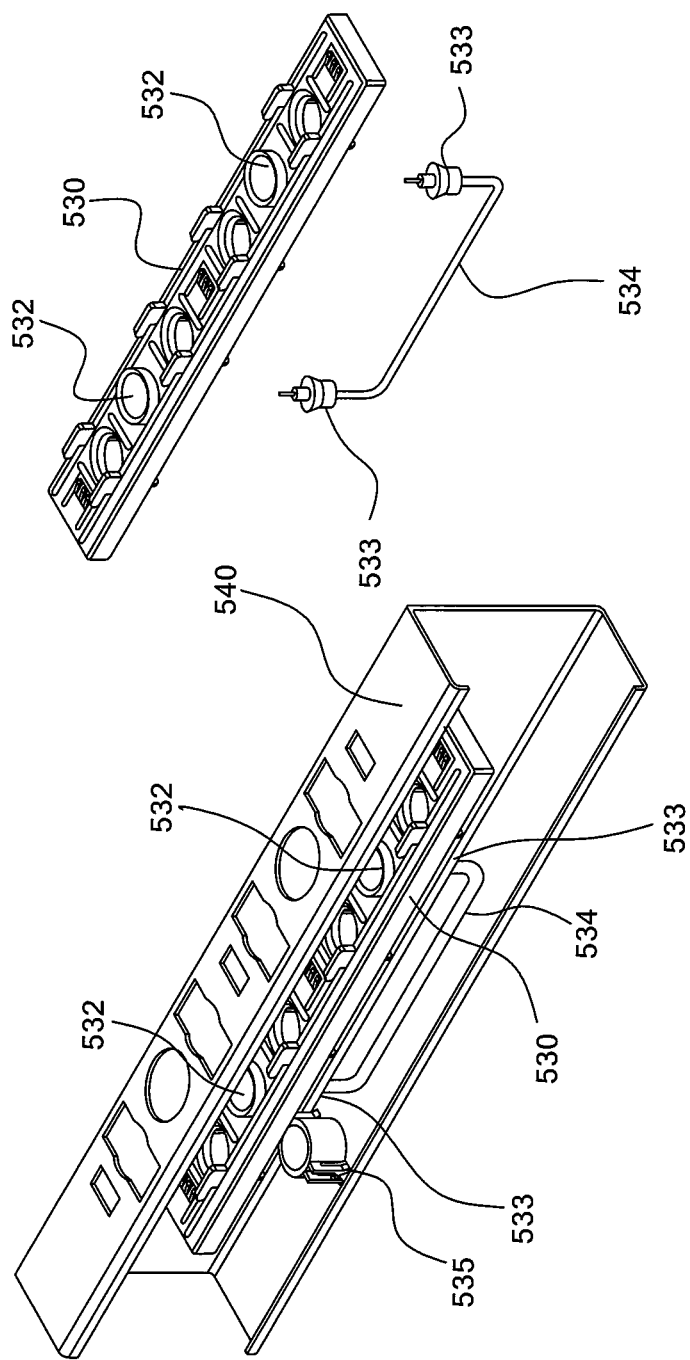
FIGS. 56A-56B show perspective views of a purlin connector and purlin according to one embodiment of the present invention (this figure is to scale)
Figure 57:
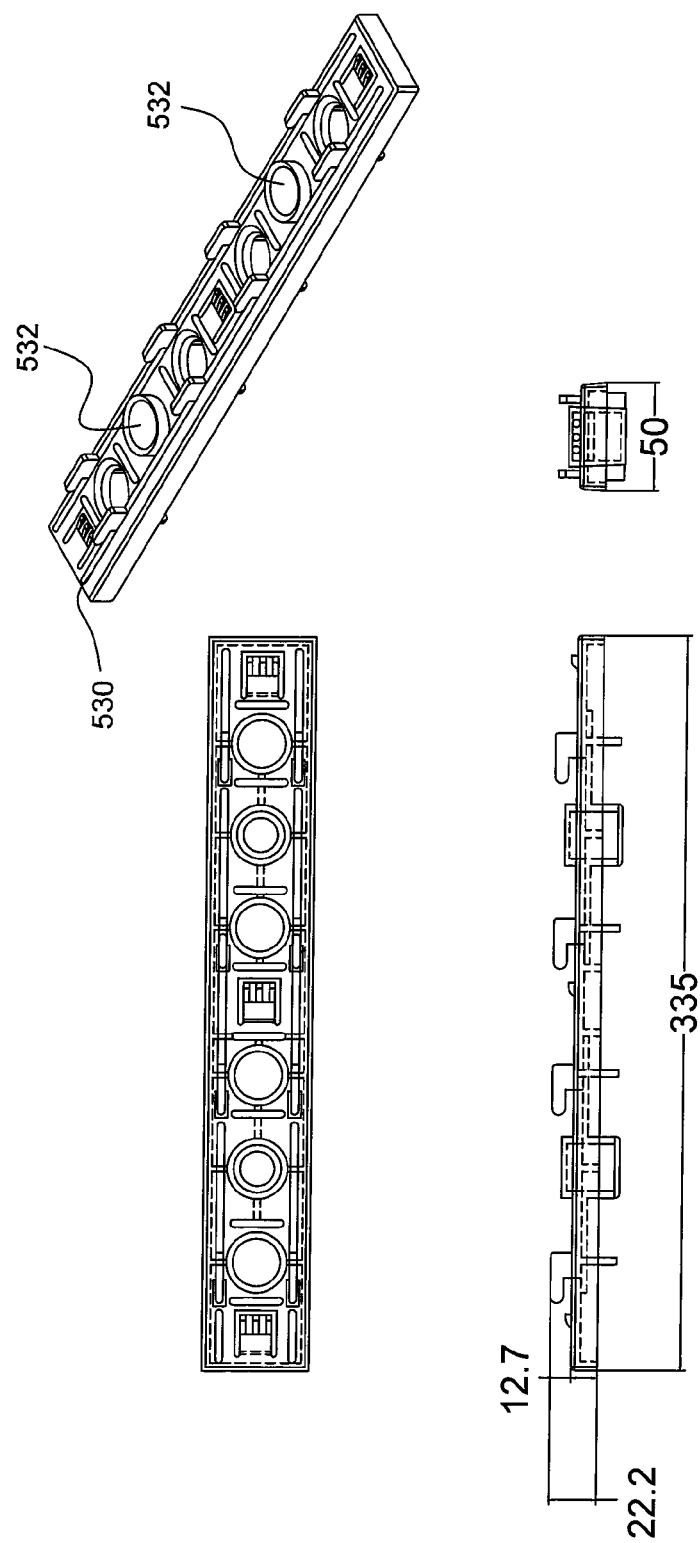
FIG. 57 shows a perspective view of a purlin connector according to one embodiment of the present invention (this figure is to scale)

FIGS. 56*a*, 56*b*, and 57 show a purlin connector 530 utilized in the PV array interconnection system 500 according to one embodiment of the present invention. In one embodiment, the connector 530 may include an area within the central receiving cylinder 532 which may incorporate a molded feature that receives an electrical connector 522 insert from below the bottom opening of the cylinder 532. This cylinder 532 also receives from above the central port 527 extending downward from the module 520. An electrical connector 533 will be inserted into the cylinder 532 from below and may be inserted by pressing the electrical connector upward 533, turning it 90 degrees, and pressing or pulling the electrical connector 533 downward to snap into place. The electrical connector 533 may further be attached to a short wire harness or coupler 534 with a corresponding electrical connector 533 that may be inserted into the adjacent cylinder 532 on the purlin connector 530 to complete the connection between adjacent modules 520. The electrical connector 533 may have an upward facing connection that projects up through the center connection cylinder 532 where it may connect with the module connector 523 upon assembly of the module connector 523 into the purlin connector 530.

In the center of the purlin connector 530 (the area between the two connection points), there may be another point at which one or more electrical system elements may be affixed by snapping them upwardly into the recessed area between the connection points. In this scenario, the short wire harness or coupler 534 may be connect to, or an integrated element of, the electrical device. Further, such a connection may be in addition to and/or replace the connection of electrical devices between the module's junction box 524 and the module connector 523. The system may also include a plastic release part 535.

Figure 58:
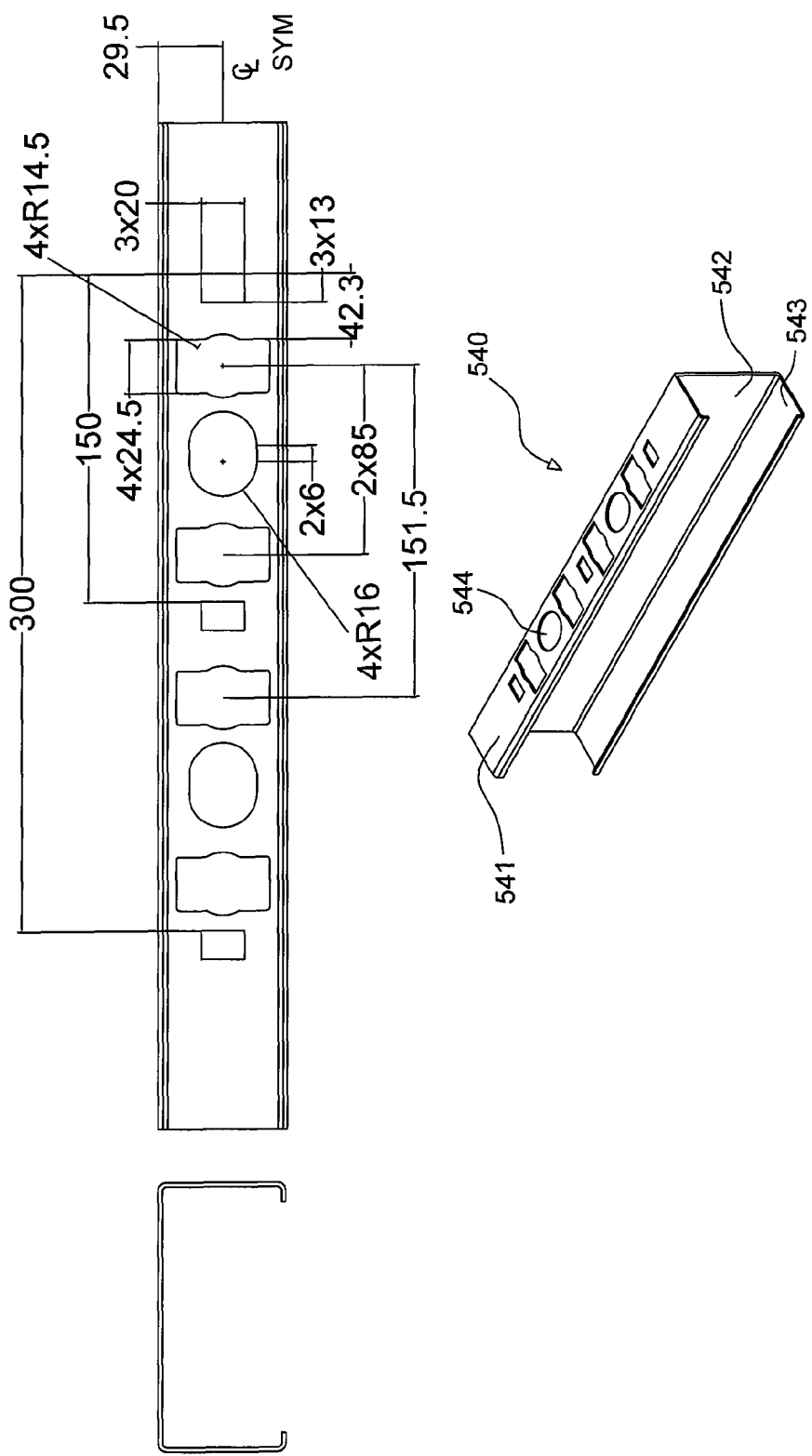
FIG. 58 shows a perspective view of a purlin according to one embodiment of the present invention (this figure is to scale)
Figure 59:
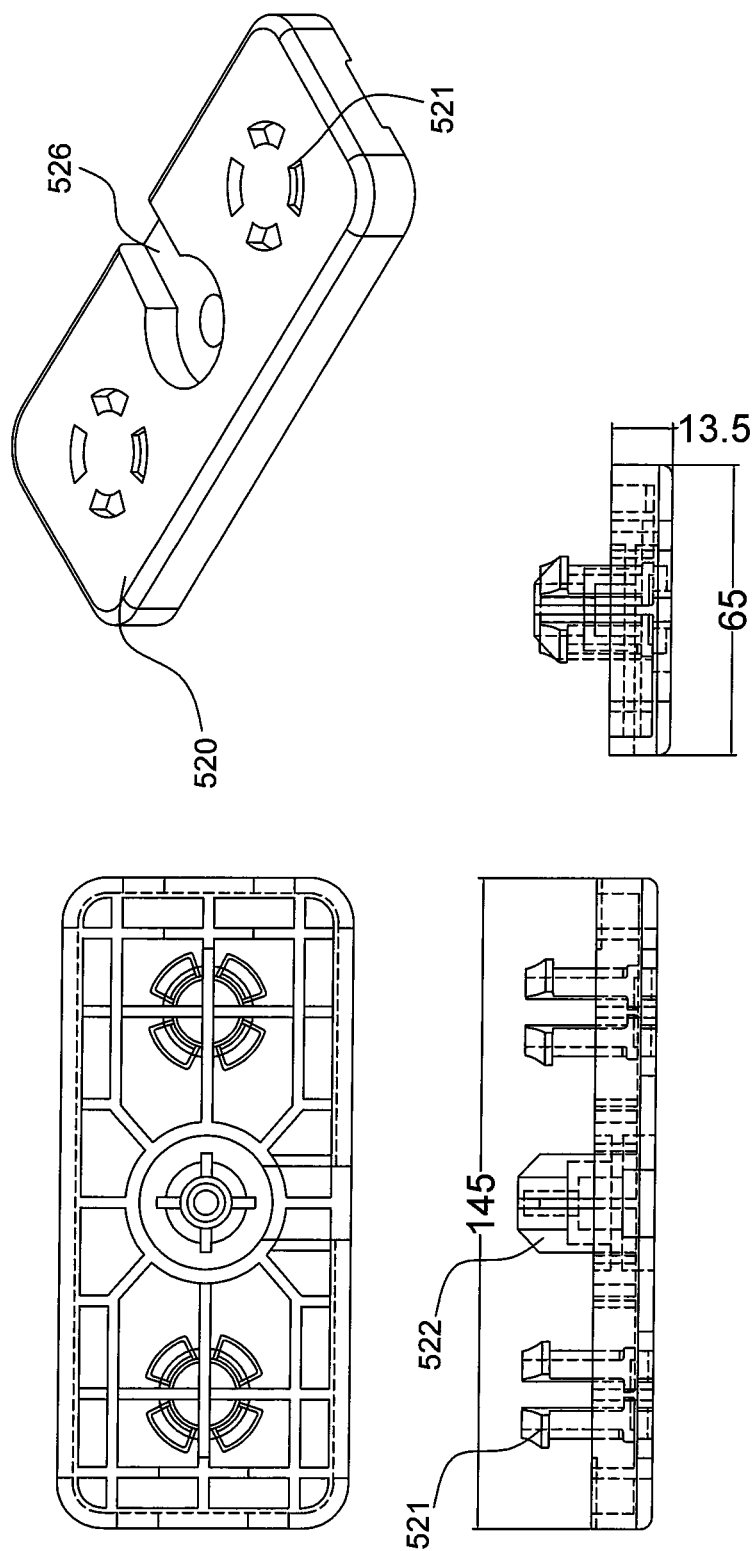
FIG. 59 shows a perspective view of a module according to one embodiment of the present invention (this figure is to scale)

FIG. 58 shows a purlin 540 according to one embodiment of the present invention. As shown, the purlin includes a top surface 541, a side surface 542, and a bottom surface 543. In one embodiment, the purlin 540 is made of metal. However, one having skill in the art will recognize the purlin 540 may be made out of a plurality of materials, including plastic, wood, carbon fiber, polymer, or any other suitable material. As shown, a specific pattern of holes 544 is punched in the top surface 541 of the purlin 540. This pattern 544 corresponds to the shape of the purlin connector 530 and module 520 used, as well as to the protrusions 521 which will extend from the bottom of the module 520 and through the pattern 544. In one embodiment, the pattern 544 may be designed to accommodate two modules 520 and one purlin connector 530. However, one having skill in the art will recognize that the pattern 544 may be adapted to utilize any number of modules 520 and connectors 530. Additionally, a variety of patterns 544 may be utilized, depending on the shape of the modules 520 utilized.

Figure 60:
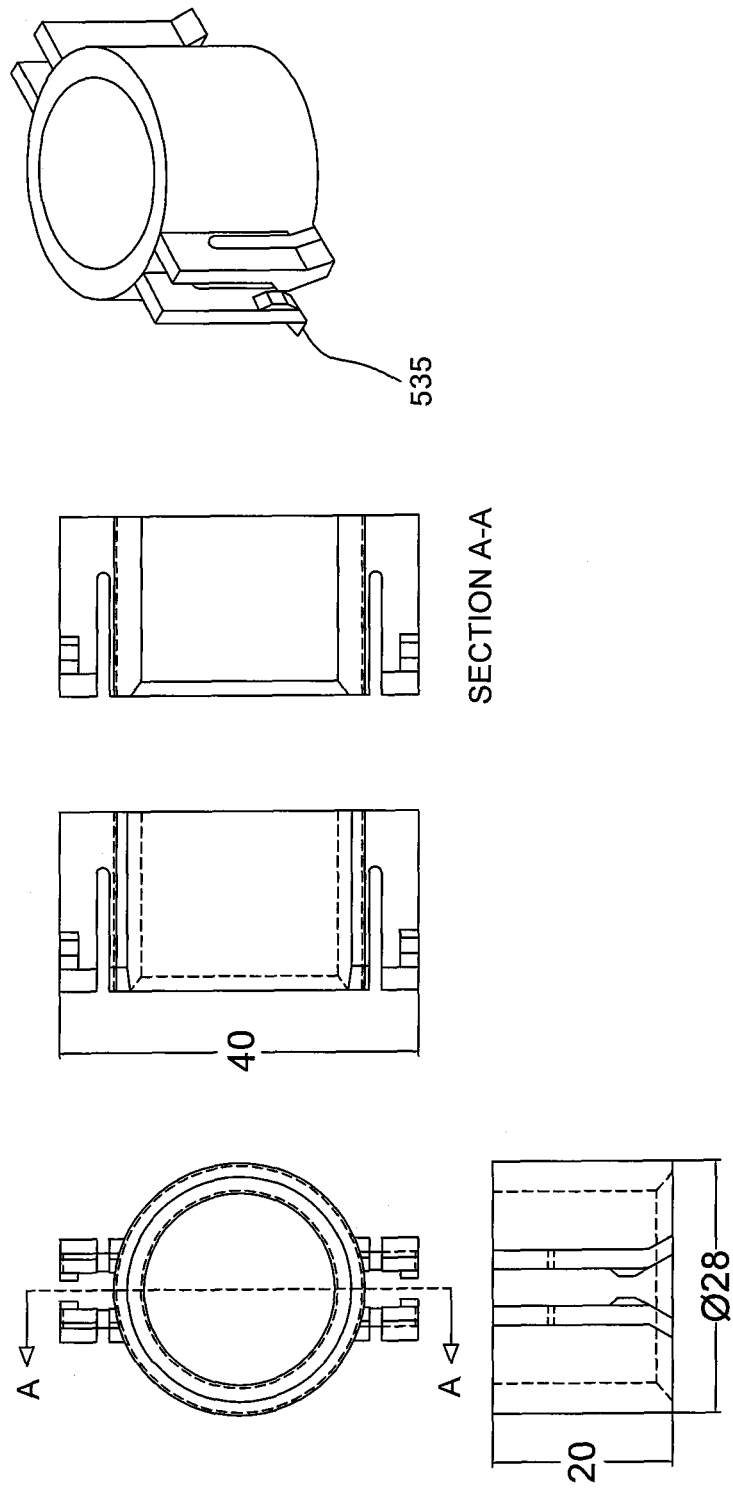
FIG. 60 shows a perspective view of a release part according to one embodiment of the present invention (this figure is to scale).

FIG. 60 shows the plastic release part 535 of FIG. 5A in greater detail. The plastic release part 535 snaps or slides into place over the teeth, thereby compressing or disconnecting them, of the module connector 523 from underneath the purlin connector 530 to allow the modules 520 to be removed from the system.

Accordingly, it can be seen that the present invention provides a mounting system for a PV array that is inexpensive, that is easy to install, that will allow relative movement of the panels and the membrane thus reducing damage to both the PV panels and the membrane, and that will allow the PV panels to be easily reconfigured, removed or replaced when needed.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claim.

What is claimed is:

1. A mount system for a photovoltaic panel, comprising: at least one module having a first side and a second side, the first side adapted to support a photovoltaic panel, said second side of the at least one module adapted to attach to the top surface of a purlin, said at least one module extending downwardly through apertures in the purlin to connect to a purlin connector, wherein the at least one module comprises two groups of protrusions arranged in a geometric pattern selected from the group consisting of a circular, rectangular, and triangular pattern, wherein each of the two groups of protrusions includes at least three protrusions, said purlin connector having a plurality of protrusion apertures adapted to receive the two groups of protrusions of the at least one module, and wherein the two groups of protrusions extend down through the purlin where they snap into place with the purlin connector.

2. The mount system of claim 1, wherein the at least one module further comprises a cavity on the first side, the cavity adapted to receive a module connector.

3. The mount system of claim 2, wherein the at least one module connector is in electrical communication with an electrical connector.

4. The mount system of claim 3, further comprising a junction box, wherein the junction box is in electrical communication with the module connector.

5. The mount system of claim 1, wherein the purlin connector is adapted to receive two of the modules.

6. The mount system of claim 3, further comprising a cable having a first end and a second end, the first end being connected to the electrical connector.

7. The mount system of claim 5, wherein the two modules are parallel to one another.

8. The mount system of claim 1, wherein said second side further comprises at least one downwardly extending electrical connector.

9. The mount system of claim 1, wherein the at least one module comprises one of a male and a female MC4 connector.

10. The mount system of claim 1, wherein a sidewall of the at least one module is adapted to snapably receive an electrical system element selected from the group consisting of a DC micro inverter, an AC micro inverter device and a system performance monitoring device, said electrical system element having an MC4-type connection adapted to connect to the module.

* * * * *